United States Patent
Awadin et al.

(10) Patent No.: US 12,207,303 B2
(45) Date of Patent: Jan. 21, 2025

(54) LISTEN-BEFORE-TALK IN BEAM CENTRIC CELLS

(71) Applicant: InterDigital Patent Holdings, Inc., Wilmington, DE (US)

(72) Inventors: Mohamed Awadin, Plymouth Meeting, PA (US); Lakshmi R. Iyer, King of Prussia, PA (US); Qing Li, Princeton Junction, NJ (US); Joseph M. Murray, Schwenksville, PA (US); Yifan Li, Wilmington, DE (US); Pascal M. Adjakple, Great Neck, NY (US); Allan Y. Tsai, Boonton, NJ (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/050,047

(22) PCT Filed: Apr. 26, 2019

(86) PCT No.: PCT/US2019/029372
§ 371 (c)(1),
(2) Date: Oct. 23, 2020

(87) PCT Pub. No.: WO2019/210185
PCT Pub. Date: Oct. 31, 2019

(65) Prior Publication Data
US 2021/0392683 A1 Dec. 16, 2021

Related U.S. Application Data

(60) Provisional application No. 62/688,024, filed on Jun. 21, 2018, provisional application No. 62/662,968, filed on Apr. 26, 2018.

(51) Int. Cl.
*H04W 74/0816* (2024.01)
*H04W 16/28* (2009.01)
(Continued)

(52) U.S. Cl.
CPC ....... *H04W 74/0816* (2013.01); *H04W 16/28* (2013.01); *H04W 72/046* (2013.01); *H04W 72/1263* (2013.01); *H04W 74/006* (2013.01)

(58) Field of Classification Search
CPC ........... H04W 74/0816; H04W 74/085; H04W 72/02; H04W 16/28; H04W 72/1263;
(Continued)

(56) References Cited

U.S. PATENT DOCUMENTS 10,966,250 B2 * 3/2021 Jiang ................ H04W 74/0816
2016/0309498 A1 10/2016 Luo et al.
(Continued)

FOREIGN PATENT DOCUMENTS

CN 107534991 A 1/2018
WO 2017/026937 A1 2/2017
(Continued)

OTHER PUBLICATIONS

Ericsson: "On Channel Access for AUL", 3GPP Draft; R1-1713312, Aug. 21-25, 2017, 3 pages.
(Continued)

*Primary Examiner* — Un C Cho
*Assistant Examiner* — Lalita W Pace
(74) *Attorney, Agent, or Firm* — Flaster Greenberg, P.C.

(57) ABSTRACT

User equipment (UE) in beam-centric telecommunications cell may use a variety of listen-before-talk (LBT) procedures and hybrid channel access procedures for uplink transmissions are on different beams and configured or scheduled in contiguous or non-contiguous mode. UE behavior may be based on the LBT result across the different beams. A gNB
(Continued)

may indicate LBT occasions to UEs. The UL numerology may be adjusted without LBT while near the end of a gNB's maximum channel occupancy time (MCOT). A gNB may use LBT procedures, before down link transmissions, using data, control, and reference signals, etc., across different beams.

15 Claims, 35 Drawing Sheets

(51) Int. Cl.
*H04W 72/044* (2023.01)
*H04W 72/1263* (2023.01)
*H04W 74/00* (2009.01)

(58) Field of Classification Search
CPC ............ H04W 74/006; H04W 74/0808; H04B 7/0695; H04B 7/088
See application file for complete search history.

(56) References Cited

U.S. PATENT DOCUMENTS

| | | | |
|---|---|---|---|
| 2016/0353467 A1 | 12/2016 | Nekovee | |
| 2017/0202022 A1 | 7/2017 | Chendamarai Kannan et al. | |
| 2017/0238334 A1 | 8/2017 | Yang et al. | |
| 2017/0332358 A1* | 11/2017 | Park | H04L 1/1671 |
| 2017/0359808 A1* | 12/2017 | Dinan | H04W 72/0413 |
| 2018/0042048 A1* | 2/2018 | Hugl | H04W 72/0446 |
| 2018/0115996 A1* | 4/2018 | Si | H04W 74/0808 |
| 2018/0176835 A1* | 6/2018 | Park | H04W 36/0061 |
| 2018/0242232 A1* | 8/2018 | Chendamarai Kannan | H04W 72/0453 |
| 2018/0294859 A1* | 10/2018 | Niu | H04L 5/0051 |
| 2019/0200389 A1* | 6/2019 | Li | H04B 7/0695 |
| 2019/0215217 A1* | 7/2019 | Kim | H04W 72/0466 |
| 2020/0008238 A1* | 1/2020 | Huang | H04W 72/0446 |
| 2020/0163128 A1* | 5/2020 | Pang | H04W 74/00 |
| 2020/0196307 A1* | 6/2020 | Yerramalli | H04W 74/085 |
| 2020/0281019 A1* | 9/2020 | Yang | H04W 16/14 |
| 2020/0314896 A1* | 10/2020 | Koorapaty | H04W 72/23 |
| 2021/0058967 A1* | 2/2021 | Oteri | H04W 16/14 |
| 2021/0135803 A1* | 5/2021 | Chang | H04W 74/0808 |
| 2021/0153245 A1* | 5/2021 | Tooher | H04W 74/008 |

FOREIGN PATENT DOCUMENTS

| | | |
|---|---|---|
| WO | 2017/131476 A1 | 8/2017 |
| WO | 2018/059512 A1 | 4/2018 |

OTHER PUBLICATIONS

Huawei et al: "Coexistence and channel access for NR-based unlicensed band operation", 3GPP Draft, R1-1717914, Oct. 9-13, 2017, 5 pages.
Interdigital Inc., "On LBT for Beam-Based Transmission for NR-U", 3GPP Draft, R1-1804885, Apr. 15, 2018, 6 pages.
Third Generation Partnership Project (3GPP), "Physical Layer Procedures", Technical Specification Group Radio Access Network, Evolved Universal Terrestrial Radio Access (E-UTRA), Release 13, 3GPP TS 36.213 V13.9.0, Mar. 2018, 395 pages.
Third Generation Partnership Project (3GPP), "Physical Layer Procedures", Technical Specification Group Radio Access Network, Evolved Universal Terrestrial Radio Access (E-UTRA, Release 14, 3GPP TS 36.213 V14.16.0, Sep. 2020, 472 pages.
Third Generation Partnership Project (3GPP), "Physical Layer Procedures", Technical Specification Group Radio Access Network, Evolved Universal Terrestrial Radio Access (E-UTRA), 3GPP TS 36.213 V15.1.0, Mar. 2018, 499 pages.
Third Generation Partnership Project (3GPP), "Revised SID on NR-based Access to Unlicensed Spectrum", Qualcomm Inc., 3GPP TSG RAN Meeting #77, Sapporo, Japan, Sep. 11-14, 2017, RP-172021, 5 pages.

* cited by examiner ical layer procedures (Release 13), V13.9: 3GPP TS 36.213,
LISTEN-BEFORE-TALK IN BEAM CENTRIC CELLS

CROSS-REFERENCE TO RELATED APPLICATIONS

This application is the National Stage Application of International Patent Application No. PCT/US2019/029372 filed Apr. 26, 2019, which claims the benefit of priority to U.S. Application No. 62/662,968, filed on 26 Apr. 2018, and U.S. Application No. 62/688,024, filed on 21 Jun. 2018, the entirety of which are incorporated by reference herein.

BACKGROUND

This disclosure relates to wireless communications using multiple beams. See, for example: 3GPP TS 36.213, Physical layer procedures (Release 13), V13.9: 3GPP TS 36.213, Physical layer procedures (Release 14), V14.6: 3GPP TS 36.213, Physical layer procedures (Release 15), V15.1.0; and 3GPP RP-172021, "New SID on NR-based Access to Unlicensed Spectrum", by Qualcomm.

SUMMARY

A user equipment (UE) may perform listen-before-talk (LBT) procedures in a beam-centric wireless communications cell on shared unlicensed spectrum, e.g., to mitigate problems with hidden or exposed nodes. Such methods may be used where the up-link (UL) transmissions are on different beams and constructed, configured or scheduled in contiguous or non-contiguous mode in time.

The UE may use number of procedures for channel access and they may be used to provide more flexibility, e.g., to address channel sensing and the tradeoffs between the sensing reliability and latency. Hybrid channel access procedures may be used for contiguous or non-contiguous beam transmissions to enhance beam utilization for LBT. UE behavior may be based on the LBT result across the different beams, e.g., for how to handle a failed LBT. Configuration and Signaling methods may be used to support beam based LBT.

A based station such as a gNB may conduct LBT procedures, e.g., before down link (DL) transmissions with data, control, and/or reference signals, etc., across different beams. The LBT procedures may include, for example, procedures for channel access for different scenarios, such as for the same or different maximum channel occupancy time (MCOT) values among the LBT beams. The gNB LBT procedures may further include ways to handle LBT failure at different beams, and methods to indicate LBT occasions to UEs to avoid unnecessary monitoring and/or blind decoding attempts to save UE's power consumption.

The uplink transmission numerology may be adjusted without LBT, e.g., while near the end of the gNB's MCOT.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with accompanying figures. The figures are not necessarily drawn to scale.

FIG. 30 is a timing diagram of an example LBT gap.

FIG. 31 is a timing diagram illustrating the shifting the LBT gap due to granted UL resources that overlap with the initial LBT gap.

FIG. 32 is a timing diagram of another example LBT gap.

FIG. 33 illustrates example wide and narrow beam based LBT with different priorities.

FIG. 34 illustrates example aligned LBT occasions across multiple beams.

FIG. 35 illustrates example dynamic LBT occasions across multiple beams.

DETAILED DESCRIPTION

Many of the abbreviations used herein are described in Table 1 of the Appendix.

Herein the terms "method" and "procedure" are used interchangeably to describe ways in which devices may be operated using to achieve certain results. Neither term is meant to imply a rigid order of operations, nor to exclude the interoperation of the many techniques described herein. It will be appreciated that the operations described herein may be executed in a variety of combinations and sequences. The methods and apparatuses described herein often manage one or more beams for communication. The terms "beam" and "beams" are often used interchangeably, such that it will be appreciated that techniques described for management of a single beam may be applied to multiple beams, and vice versa.

Unlicensed Spectrum in LTE

As specified in 3GPP TS 36.213, Physical Layer Procedures, for Release13 and Release 14, Licensed-assisted access (LAA) targets the carrier aggregation (CA) operation in which one or more low power secondary cells (SCells) operate in unlicensed spectrum in sub 6 GHZ. LAA deployment scenarios encompass scenarios with and without macro coverage, both outdoor and indoor small cell deployments, and both co-location and non-co-location (with ideal backhaul) between licensed and unlicensed carriers, as shown in FIGS. 1A-1D.

Figure 1A:
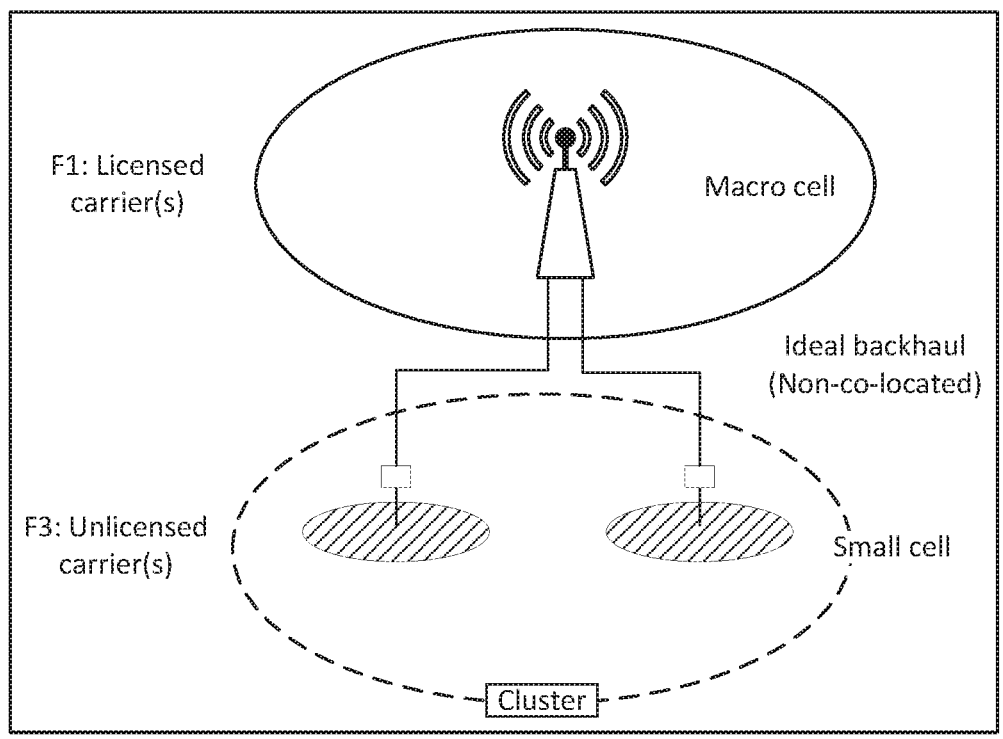
FIGS. 1A-1D show system diagrams for four example LAA deployment scenarios.
Figure 1B:
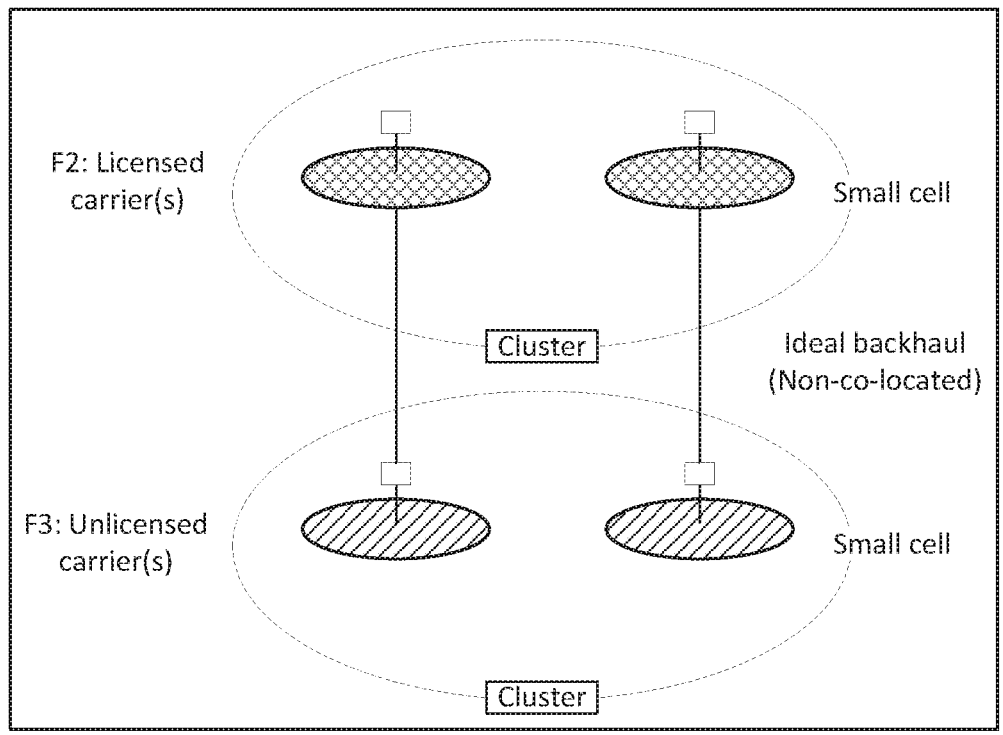
Figure 1C:
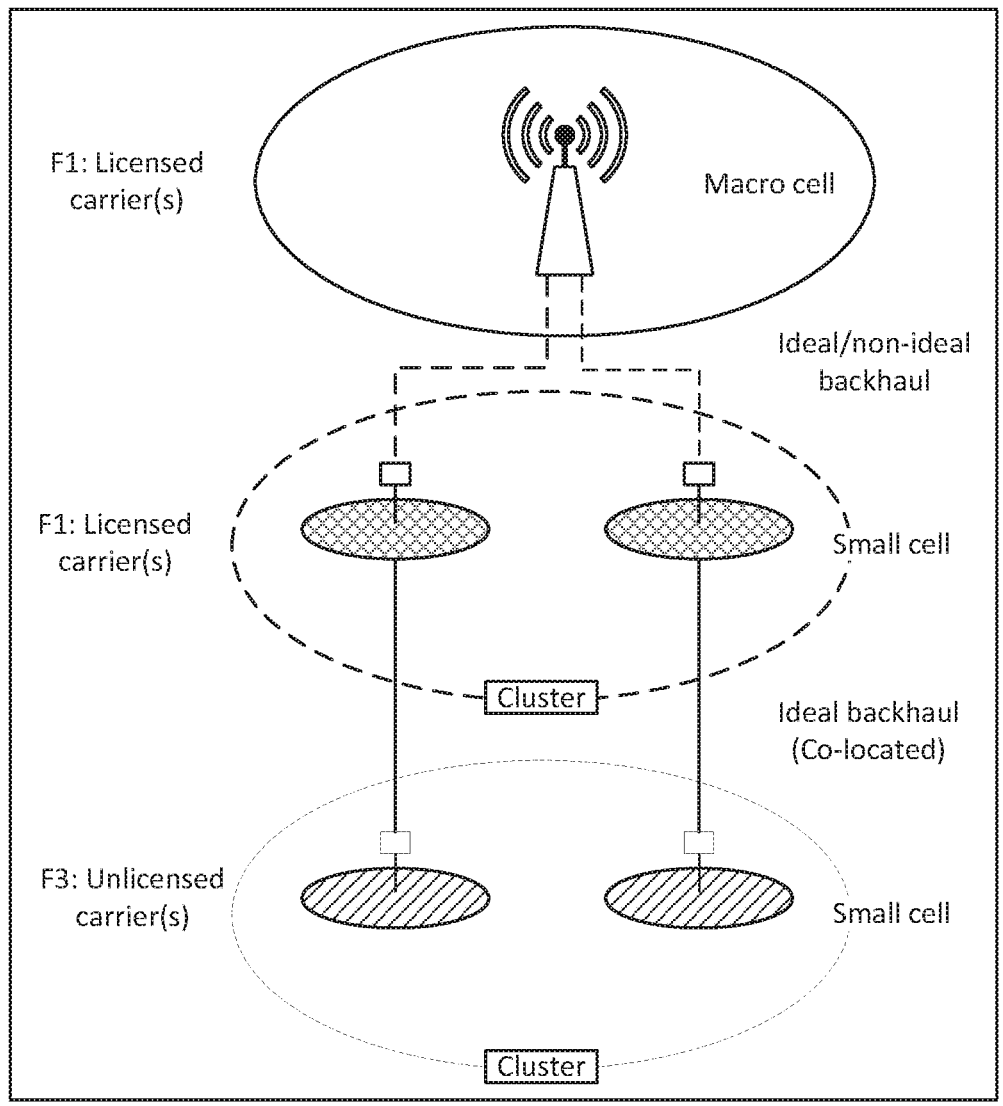

Scenario 1 of FIG. 1A depicts carrier aggregation between licensed macro cell (F1) and unlicensed small cell (F3). Scenario 2 of FIG. 1B depicts carrier aggregation between licensed small cell (F2) and unlicensed small cell (F3) without macro cell coverage. Scenario 3 of FIG. 1C depicts a licensed macro cell and small cell (F1), with carrier aggregation between licensed small cell (F1) and unlicensed small cell (F3).

Figure 1D:
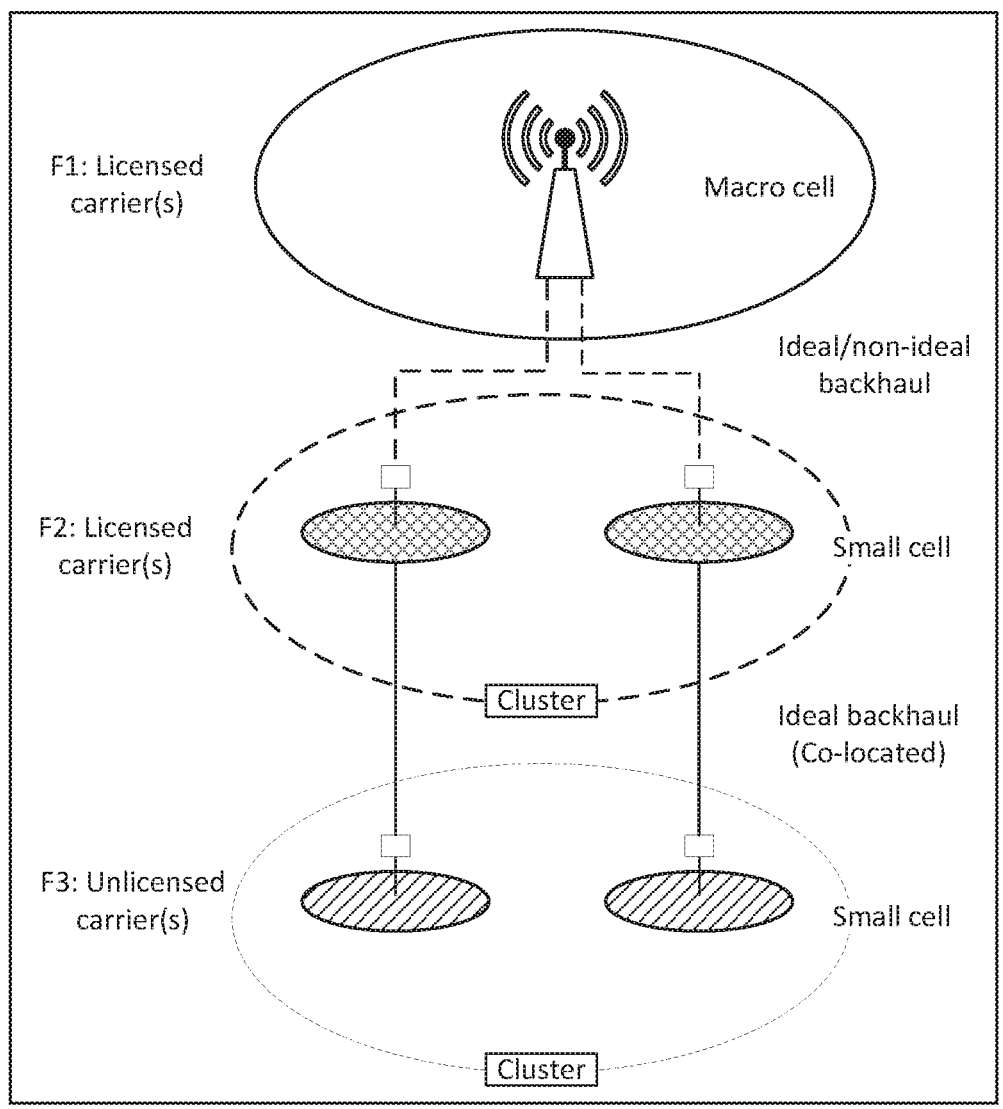

Scenario 4 of FIG. 1D depicts a licensed macro cell (F1), licensed small cell (F2), and unlicensed small cell (F3). Scenario 4 includes carrier aggregation between licensed small cell (F2) and unlicensed small cell (F3). If there is ideal backhaul between macro cell and small cell, there may be carrier aggregation between macro cell (F1), licensed small cell (F2) and unlicensed small cell (F3). If dual connectivity is enabled, there can be dual connectivity between macro cell and small cell.

Since unlicensed band may be utilized by different deployments specified by different standards, several regulatory requirements are imposed to insure fair coexistence between all incumbent users. For example, these regulatory requirements include constraints on transmit power mask, transmit bandwidth, interference with weather radars, etc.

Another main requirement is channel access procedure. The LBT procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

In Release 14, several channel access procedures are introduced to be performed by eNB and UE for both downlink (DL) and UL transmissions, respectively. The main channel access procedure is described in Section 15 of TS 36.213 Release 14.

Unlicensed Spectrum in NR

In mmWave, there is wide range of unlicensed spectrum that may be further utilized to attain higher data rate than attained by operating in sub and or above 6 GHz frequency band. Narrow beams are deployed for transmission and reception above 6 GHZ up to 52.6 GHz or even above 52.6 GHz bands. Procedures to enhance the co-existence between NR-U and other technologies operating in the unlicensed, e.g., Wi-Fi devices, LTE-based LAA devices, other NR-U devices, etc., and meet the regulatory requirements are essential to a NR system operating on unlicensed spectrum.

Example Challenges of Conventional Technology

To overcome high path loss in mmWave, the uplink and downlink transmissions are conducted with highly directional antennae. Consequently, both gNB and UE have to construct narrow beams for transmission and reception in a beam centric cell.

Due to increasing interest to further support high data rate applications, new radio unlicensed (NR-U) is among the possible candidates to achieve this goal by supporting transmission/reception on the unlicensed frequency bands sub- and above 6 GHz spectrum. In either frequency bands, i.e., sub- or above 6 GHz, several regulatory requirements are imposed to allow friendly co-existence with the incumbent unlicensed systems such as IEEE 802.11 ad/ay. LBT is among those requirements to organize the medium access.

Conventional LBT based on omni or quasi-omni antennas may not operate effectively due to the limited coverage range in above 6 GHz spectrum caused by sharp attenuation at high frequency bands. Using omni antenna based LBT results in that hidden/exposed problem becomes more evident which negatively affect the fair coexistence between other users using the unlicensed band. Beam-based LBT may be used to address challenges in mmWave using narrow beams.

Performing LBT in Beam Centric Cells

Beam specific LBT may be performed on either the UE or gNB side, or both. For example, a UE's or gNB's capabilities of constructing narrow beams may be exploited to enhance the spatial multiplexing gains by allowing non-interfering transmissions to coexist.

LBT Procedures at UE Side

A UE may be scheduled or configured to transmit on a beam set C in different cases. For example, the UE performs beam sweeping for UL beam management which may be used to enable TRP measurement on different UE Tx beams to support selection of UE Tx beams and TRP Rx beam(s): UE may repeat the transmitted data on multiple UL beams for robustness: or the UE transmits data using multiple beams with different UL grants. The UE needs to conduct LBT before transmitting on one or multiple UL beams. One or more of the techniques described herein may be used to perform beam based LBT at the UE side for multiple UL beams transmissions.

LBT for Contiguous Beam Transmission:

The beams set C may be configured to be transmitted in contiguous OFDM symbols or slots, then the UE may perform LBT across the different beams as follows.

Type C1 LBT: Full Channel Access Procedure

Figure 2:
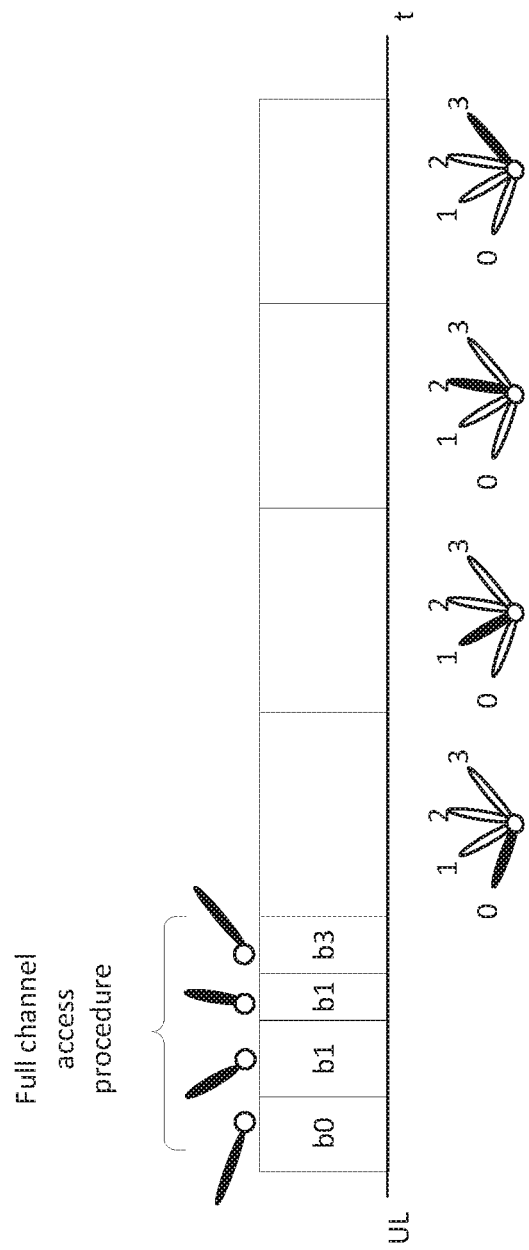
FIG. 2 is a timing diagram for an example Type C1-full channel access procedure for use with each LBT beam contiguously.

The UE consecutively performs a series of full channel access procedures in which extensive channel sensing procedures are deployed to enhance friendly co-existence with other technologies using the same spectrum, for example, they may include, but not limited to, several deterministic channel sensing occasions, or random sensing duration or both, on all beams $c_i \in C$ as shown in FIG. 2 for example. This procedure consists of several LBT gaps to perform full channel access procedure on the LBT beams, e.g. b0 for beam 0, b1 for beam 1, b2 for beam2 and b3 for beam3 as illustrated in FIG. 2. In each LBT beam gap, the UE may perform channel sensing with the LBT beam and make a decision whether the channel is idle or not for this LBT beam. Each LBT beam gap may have the duration equal to $n_{c_i}$ where $n_{c_i}$ is LBT beam specific LBT gap in which the full channel access procedure is applied. It may depend on several factors such as network loading status, the number of fixed sensing durations or slots, the number of random sensing durations or slots, the latency and quality requirements on that beam, etc. For example, full channel access procedures may be category (CAT) 3 or CAT 4 LBT, where in CAT3 LBT a fixed number of sensing durations/slots is used while in CAT4 LBT a random number of sensing durations/slots is used to sense the channel availability. If the full channel access procedure is accomplished successfully within the preconfigured or indicated gap for any beam $c_i$, then it may be considered as a successful attempt and the channel may be declared as idle and therefore the LBT beam is idle. Otherwise, the beam may be declared to be non-idle and the UE cannot transmit on that the UL beam associated with this LBT beam. Also, as shown in FIG. 2, the dedicated gaps of each beam may be different.

The full channel access procedure may be applied in the same order in which the beams are transmitted as shown in FIG. 2, for example. However, other beam sensing orders may be adopted, for example, random or reversed order comparing with the transmission order.

The UE may be indicated or configured to perform LBT on beams that have spatial relationship and/or link association with down link-reference signal (DL-RS), such as primary synchronization signal (PSS)/secondary synchronization signal (SSS) in synchronization signal block (SSB) and channel state information reference signal (CSI-RS).

Upon the result of the full channel access procedure, the UE may only transmit on the UL beams that are associated with the idle LBT beams, i.e. the channel is clear for accessing to the associated UL beam(s). Moreover, the UE may transmit on UL when at least one LBT beam is idle and the UE may not transmit on UL beams that are associated with non-idle LBT beam.

Figure 3:
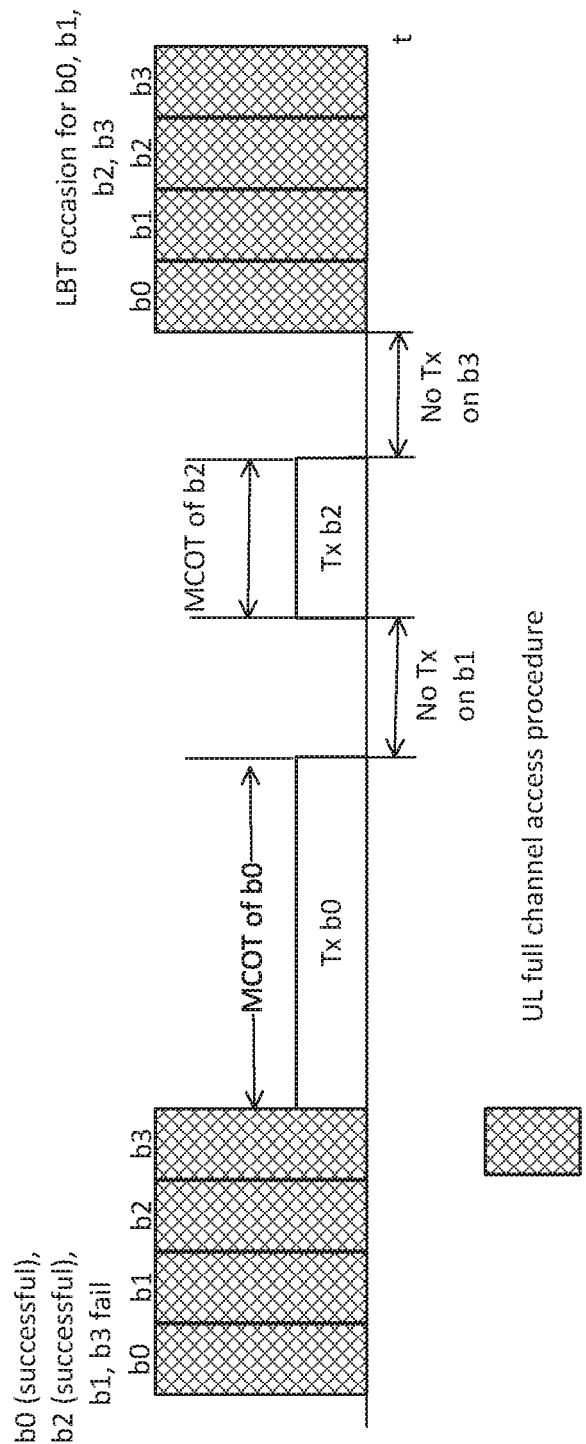
FIG. 3 is a timing diagram for an example procedure for handling an LBT failure.

For those beams failed LBT, the UE may wait for the next LBT occasion as shown in FIG. 3. For example, in the first LBT occasion, the UE performs Type C1 LBT which results in that b0 and b2 are idle with successful LBT while b1 and b3 are not idle due to the failure of LBT. In this case, as shown in FIG. 3, UE may proceed transmitting the scheduled or configured data bursts on beams b0 and b2 while it may remain silent on beams b1 and b3 that correspond to failed LBT beams until the next LBT occasion. If the UE still has data to be transmitted on b0 and b2, then it performs Type C1 LBT for all the beams again as illustrated in FIG. 3. However, in case no transmission is needed on beams b0 and b2, the UE may perform Type C1 LBT on b1 and b3 only.

The beams set C may change depending on the UL scheduling or the configurations. Consequently, the LBT beams associated with the beams set C may change from one LBT occasion to another.

Figure 4:
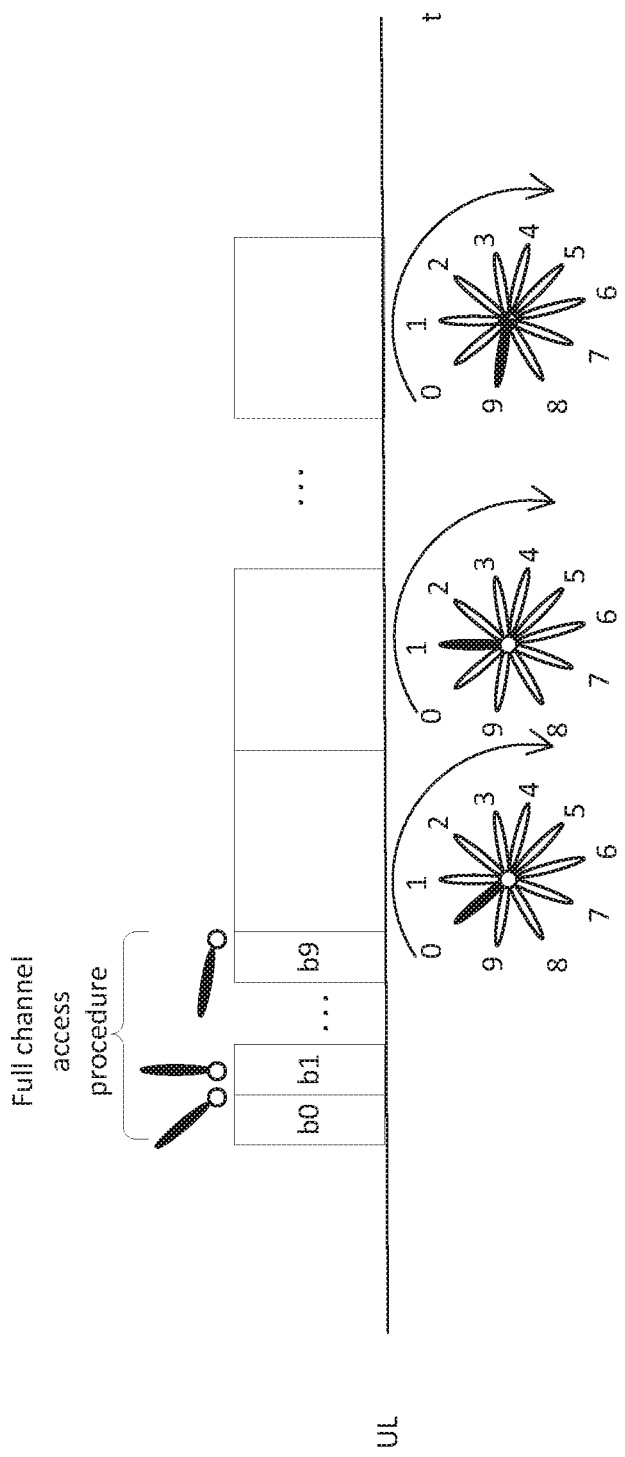
FIG. 4 is a timing diagram for an example Type C1 full channel access procedure for LBT beams covering 360 degrees.

FIG. 4 shows the case which the UE is configured or signaled to perform LBT on multiple directions that may cover spatial directions illustrated in FIG. 2, up to 360°. The same concepts discussed are still applicable for this case. The UE may be instructed to conduct such channel sensing even if the UE has no UL transmissions to assist the gNB in sensing the channel around the UE and avoid the hidden nodes for DL transmissions.

Type C2: Hybrid Channel Access Procedure

Figure 5:
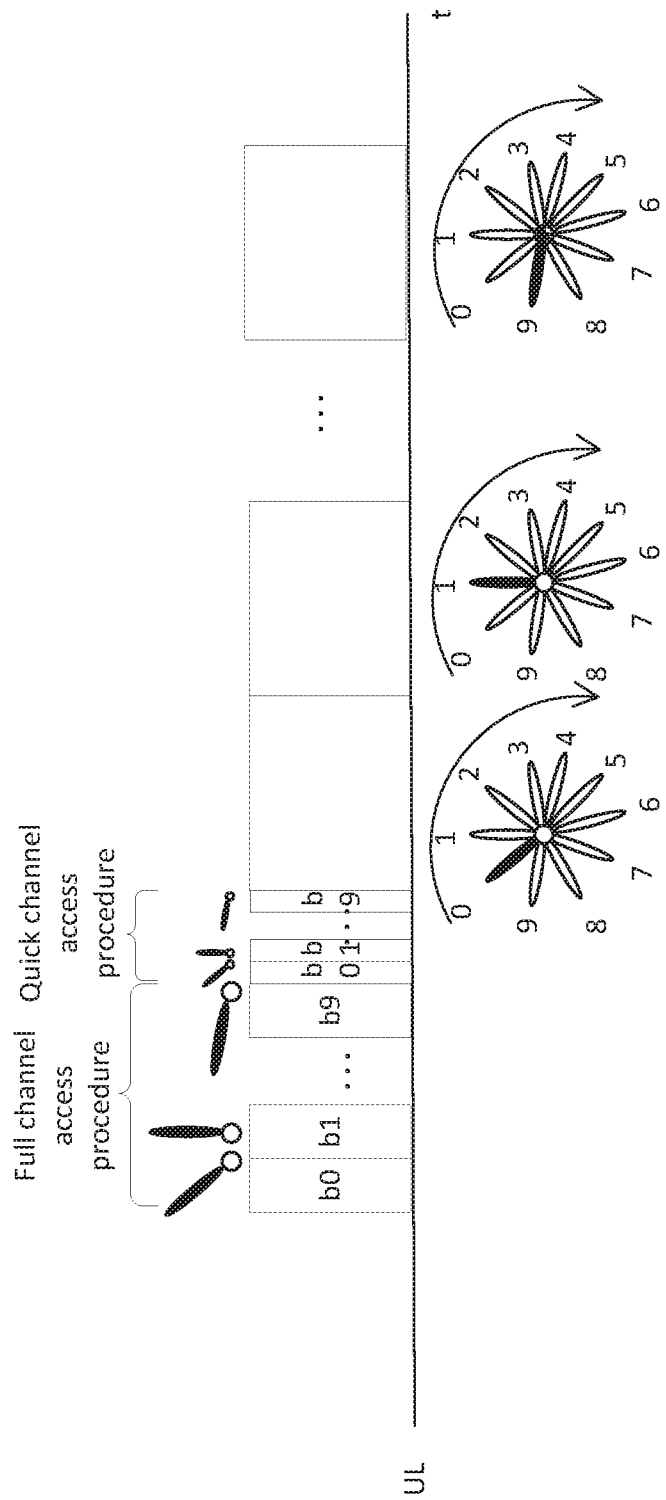
FIG. 5 is a timing diagram for example Type C2 hybrid channel access procedures for each LBT beam contiguously.

To further enhance the channel access reliability, it may be advantageous to use both the full channel access procedure described in Type C1 and quick channel access procedure which can be accomplished in shorter duration than the full channel access procedure. One of the key differences between full and quick channel access procedures may be that quick channel access procedure has no random sensing duration to reduce the overall channel access procedure duration. For example, quick channel access procedures may be CAT 2 LBT, wherein the channel is sensed for fixed time duration of 25 μs. A hybrid approach with both full and quick channel access procedures is shown in FIG. 5. This can be adopted for the case that the beams cover part or sector of the cell. The full channel access procedure may be applied first followed by the quick channel access procedure. The LBT gap dedicated to perform the quick channel access procedure for each beam may be beam specific and it duration is denoted by $T_{sUL\_c_i}$ for the $c_i^{th}$ beam or it may be independent of the beams.

The beam $c_i$ may be declared idle in different scenarios. In Scenario 1, it may be declared idle if it is idle based on both full and quick channel access procedures. In Scenario 2, it may be declared idle only if it is idle based on quick channel access procedure.

Only the UL beams that are associated with idle LBT beams may be used for UL transmission, i.e. the channel in that spatial direction is clear. The UE may handle the beams with failed LBT similarly as shown in FIG. 3, e.g., to wait till the next LBT occasion.

Type C3 LBT: Hybrid Channel Access Procedure with Random Selection.

Figure 6:
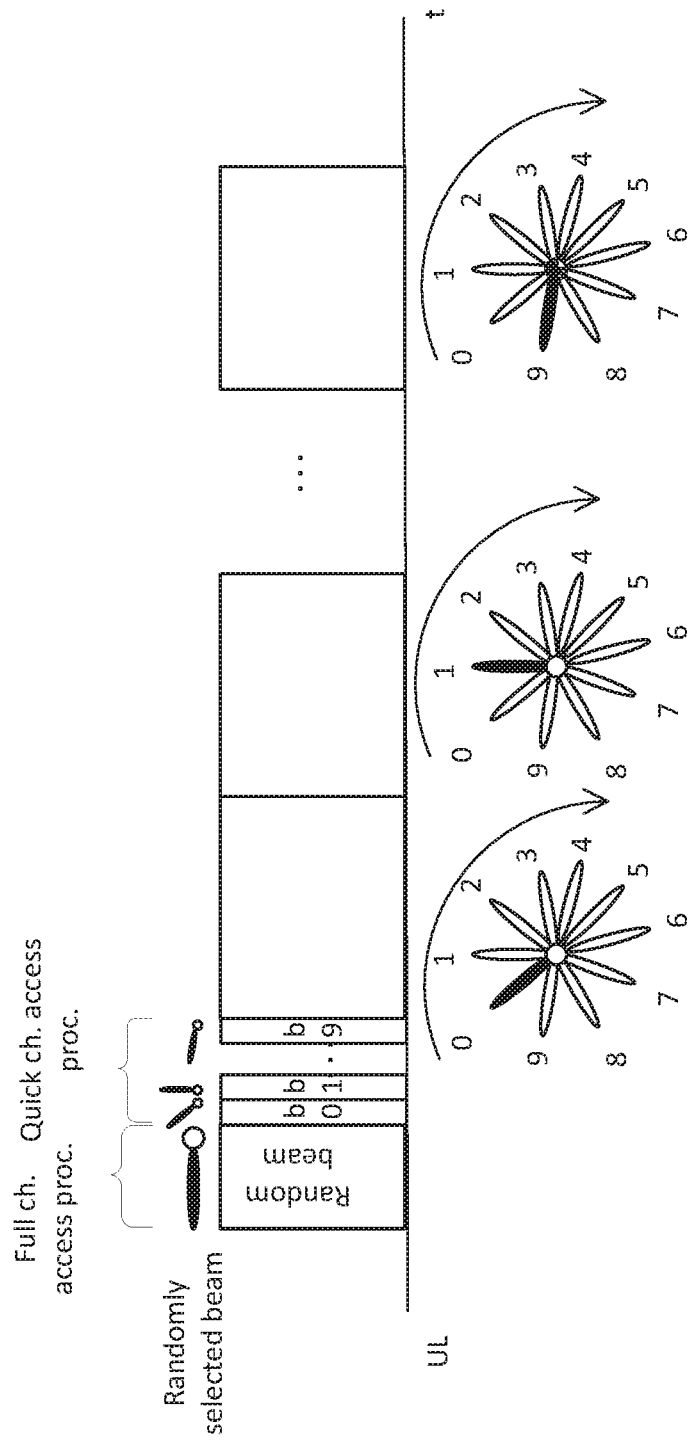
FIG. 6 is a timing diagram for example Type C3 hybrid channel access procedures with random selection for all LBT beams contiguously

As another embodiment to combine full and quick channel access procedures, the UE may randomly select one beam out of the beams set C and sense the channel using full channel access procedure. If the channel is idle for that beam, UE may proceed quick channel access procedures with LBT beams of set C as shown in FIG. 6. Such solution can be easily extended to the case that beams partially cover the cell, e.g., where multiple beam based LBT is needed. In this case, the beam $c_i$ is only declared idle based on quick channel access procedure.

Type C4 LBT: Full Channel Access Procedure with Grouped LBT Beams

Figure 7:
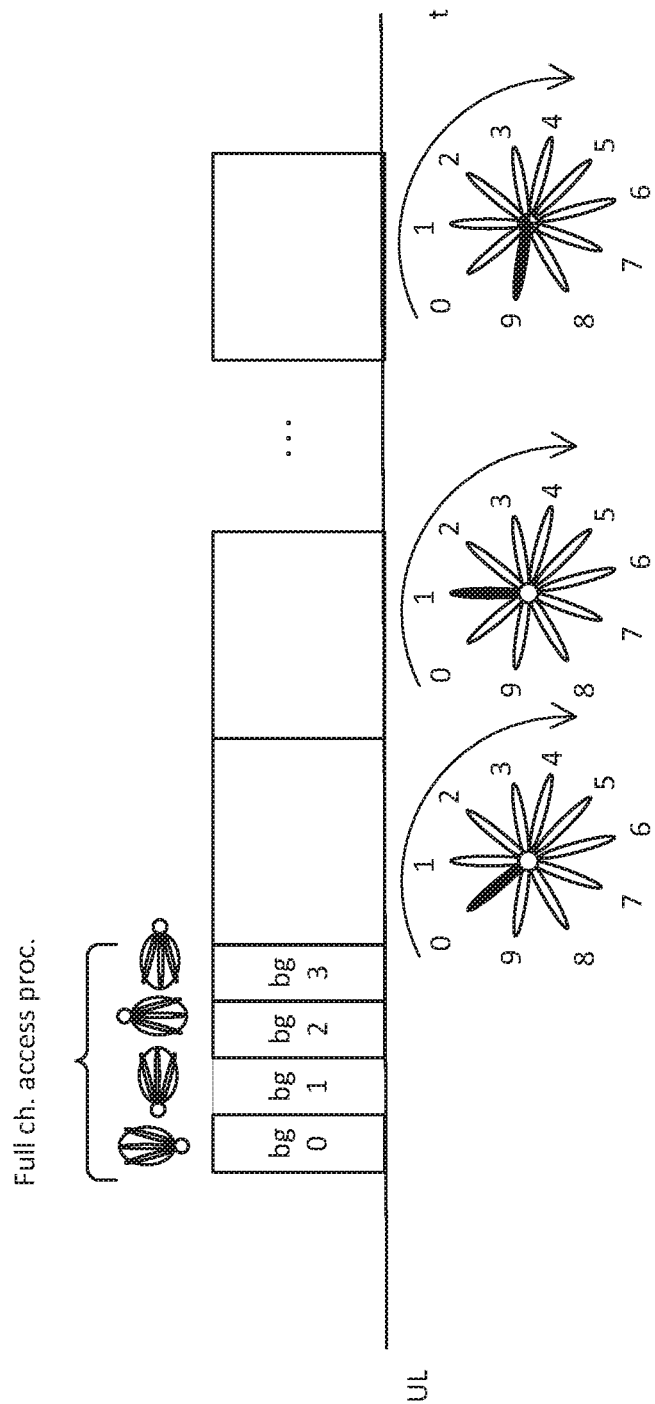
FIG. 7 is a timing diagram for example Type C4 full channel access procedures with grouped beams.

Rather than performing full channel access procedure on all the LBT beams individually, the UE may group the narrow LBT beams into multiple beam groups, i.e. forming a wider LBT beam combined with multiple narrow LBT beams based on the spatial relationship, and apply full channel access procedure with the grouped LBT beams as shown in FIG. 7. Also, the wide LBT beam formed by all the narrow beams may be replaced with a single wide beam with similar spatial coverage. In case of LBT failure for the wide beam, UE may conduct full or quick channel access procedure with the narrow beams that are grouped to form the wide beam.

Type C5 LBT: Hybrid Channel Access Procedure with Wide and Narrow LBT Beams

Figure 8:
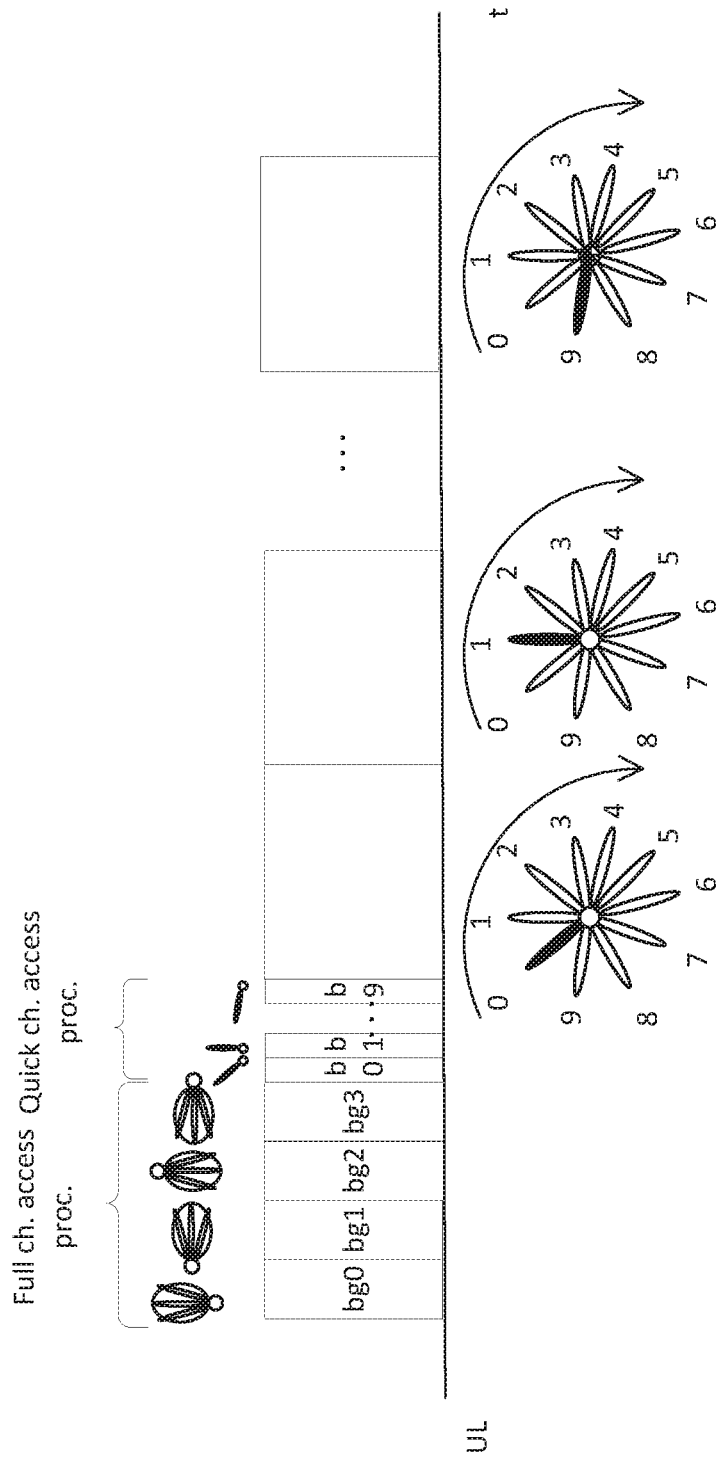
FIG. 8 is a timing diagram for example Type C5 hybrid channel access procedures with wider and narrow LBT beams.

Moreover, both full and quick channel access procedures may be deployed as demonstrated in FIG. 8. In this case the narrow beam may be declared idle if the beam group (bg) which that narrow belongs to is idle based on full access procedure and is idle based on its quick access procedure. Moreover, the narrow beam may also be declared idle if the narrow beam belongs to the group that is not idle based on full channel sensing while it is idle based on quick access procedure later.

Type C6 LBT: Hybrid Channel Access Procedure with Randomly Grouped LBT Beams

Figure 9:
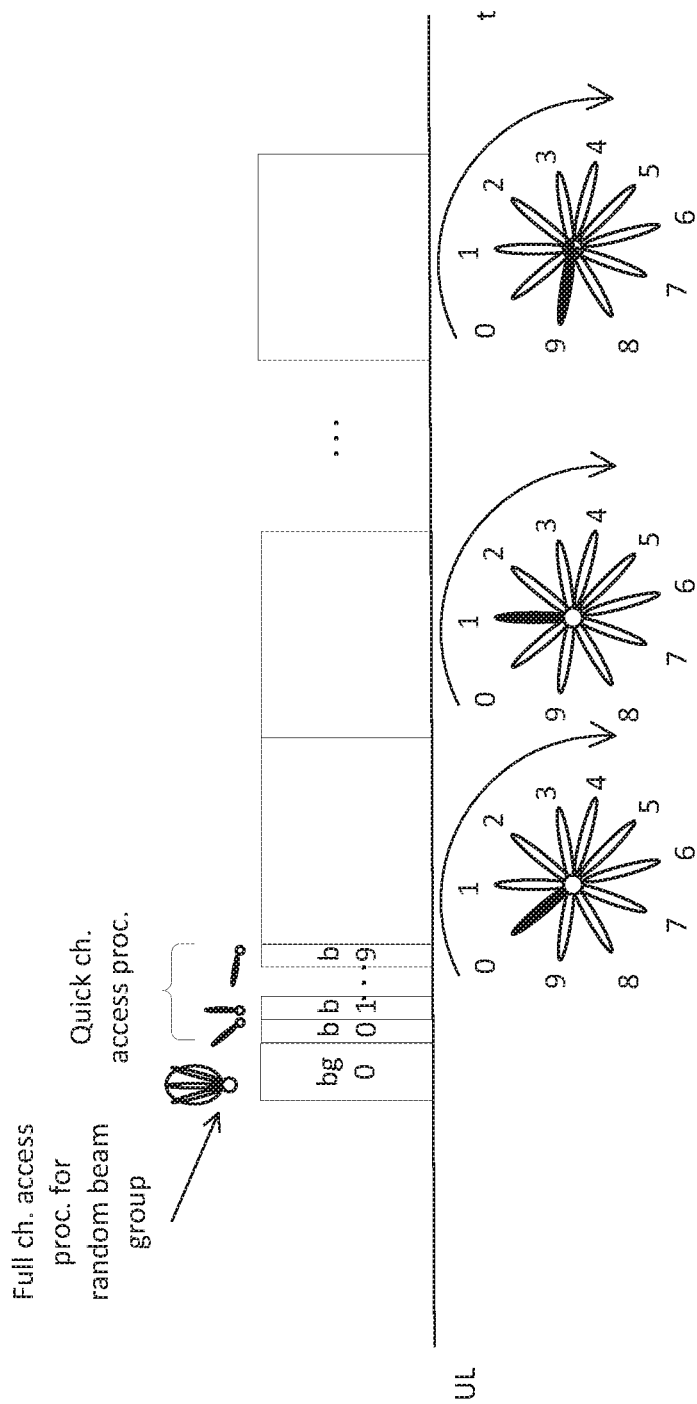
FIG. 9 is a timing diagram for an example Type C6 hybrid channel access procedure with randomly selected group LBT beams.

The UE may also randomly choose one or multiple beam groups to perform full channel access procedure followed by narrow beam quick channel access procedure as illustrated in FIG. 9 for example. In this case, for any narrow beam to be declared idle, if its channel sensing based on quick channel access procedure is at least idle.

Figure 10:
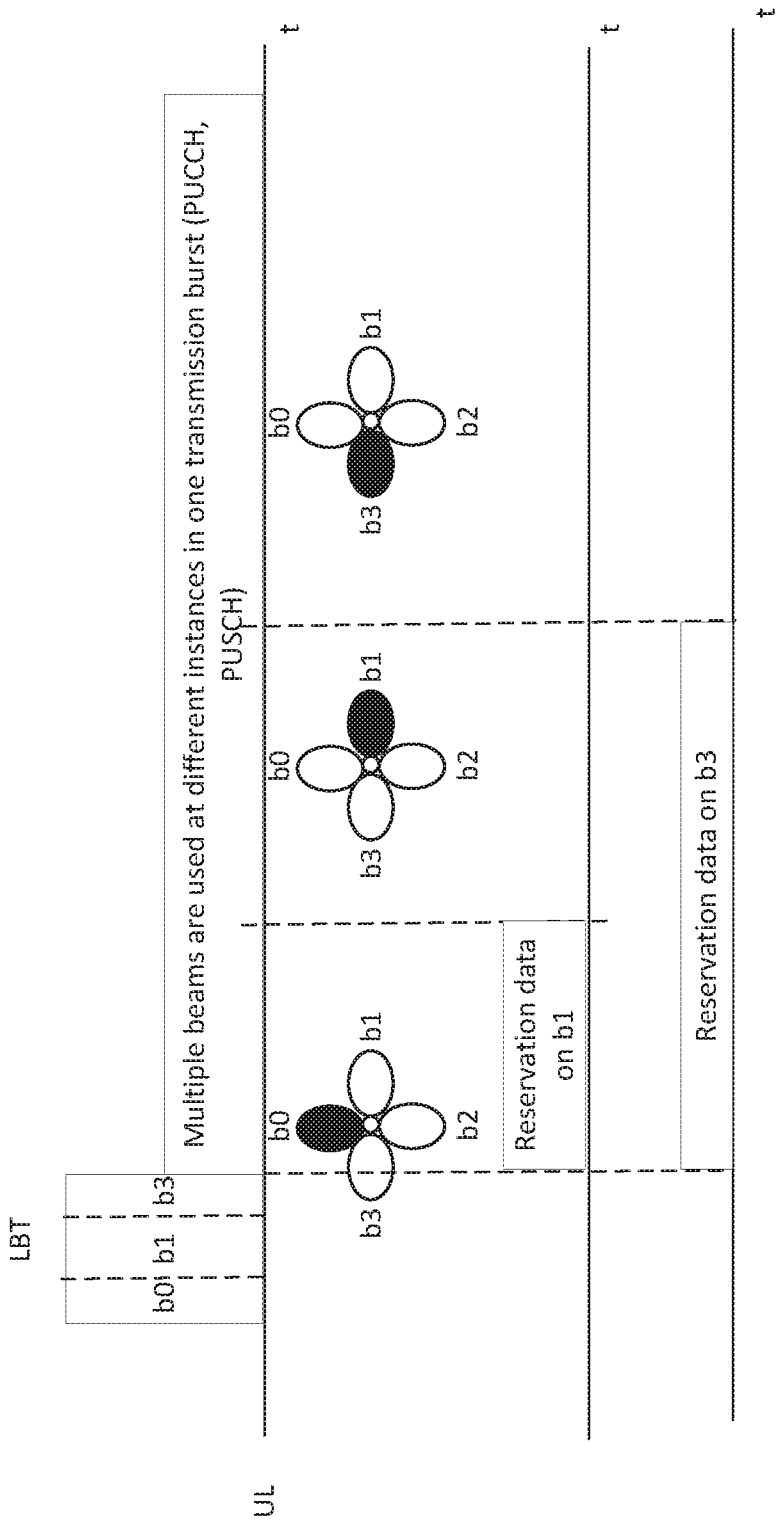
FIG. 10 is a timing diagram for an example Type C7 LBT full channel access procedure for multi-panels UEs.

The beam group may be constructed based on several factors such as the spatial direction of the beams, their channel characteristics, QoS requirements. Type C7 LBT: Full channel access procedure for multi-panels UEs For a capable UE, e.g., equipped with multiple antenna array panels that are able to transmit across different beams on the same time-frequency resources using spatial orthogonality, the UE may perform Type C1, C2, C3, C4, C5, or C6 UL channel access procedure with multiple LBT beams. The associated UL beams may carry same or different data. For UL transmissions on the same frequency resources on different UL beams on contiguous mode as illustrated in FIG. 10, for example, it is impossible for the UE to perform LBT on particular UL beam while transmitting on others due to self interference between co-located panels. Therefore, in this embodiment, a method for continuously switching between UL transmission beams without LBT interrupting the transmission burst may be used.

For the UL beams associated with successful LBT beams, if not occupied immediately after the LBT gap, UE may transmit reservation data, which may be sequence or special patterns, or even random data in payload, to maintain the UL channel access on this beam and prevent other devices operating in the unlicensed band to access the medium associated with that beam as shown in FIG. 10. The sequence or special pattern may be known to the other devices for UE type indication, e.g. a cellular device under a specific service provider's network.

For UL beams associated with unsuccessful LBT beams, the UE remains silent and may not transmit any data on them.

LBT for Non-Contiguous Beam Transmission

The beam set (may be configured to be transmitted in non-contiguous OFDM symbols or slots with interlaced gaps, and a UE may perform beam based LBT across different beams as follows.

Type D1 LBT: Interlaced Full Channel Access Procedure

Figure 11:
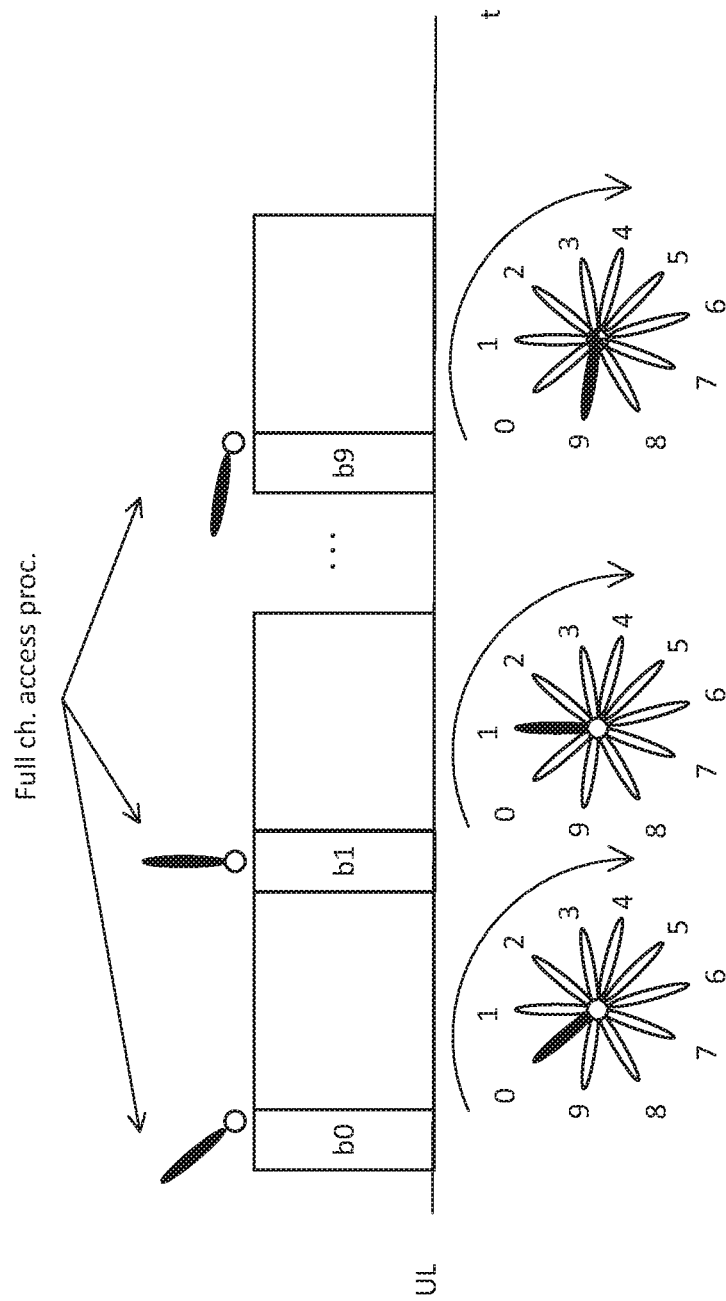
FIG. 11 is a timing diagram for an example Type D1 LBT interlaced full channel access procedure for narrow LBT beam.

The gap intervals may be wide enough to allow the UE to sense the channel using full channel access procedure as illustrated in FIG. 11 for example. The LBT gap duration prior each beam transmission may be beam-specific and is equal to $n_{c_i}$ or independent of beam denoted by $\eta$. During the gap, full channel access procedure is applied which may depend on several factors such as network loading status, the number of fixed sensing durations or slots, the number of random sensing durations or slots, the latency and quality requirements on that beam. If full channel access procedure for any beam $c_i$ has not successfully completed in its dedicated LBT gap, then the beam associated with non-idle LBT beam will not be used by the UE for a UL transmission.

Type D2 LBT: Interlaced Hybrid Channel Access Procedure

Figure 12:
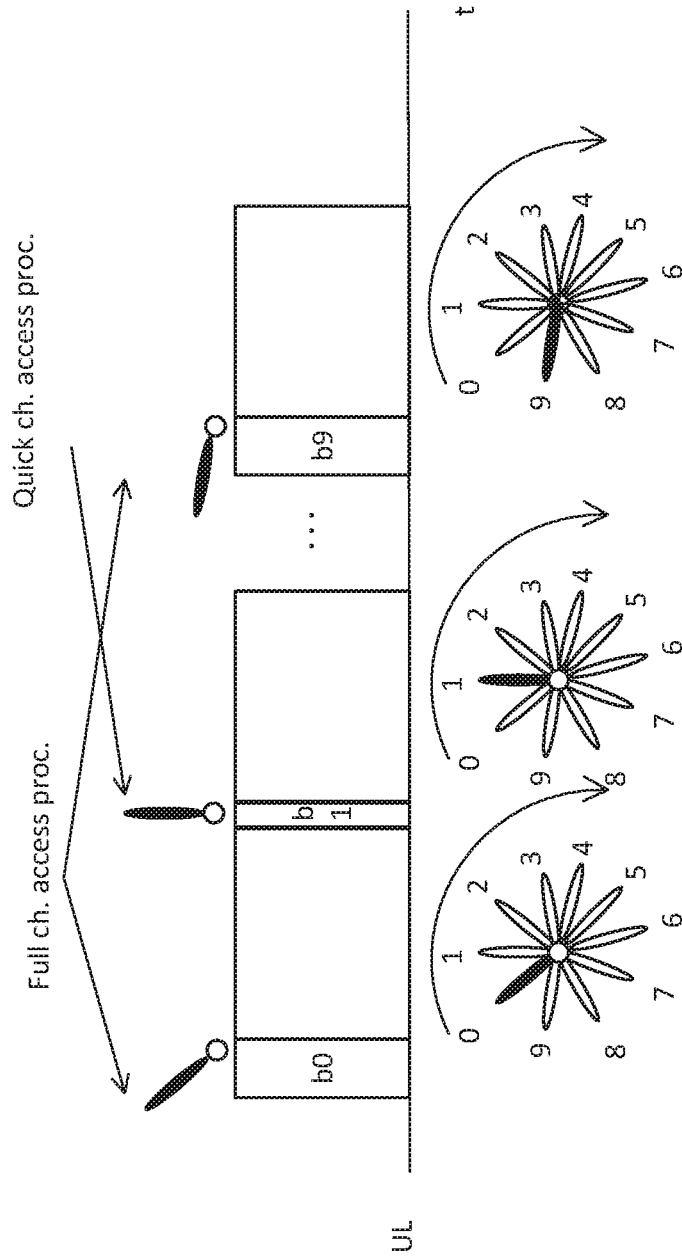
FIG. 12 is a timing diagram for an example Type D2 LBT interlaced hybrid channel access procedure.

The gaps between the data burst transmitted across the different beams may not be large enough to allow full channel access procedure to be performed successfully with high probability. Consequently, Type D2 LBT based on interlaced hybrid channel access procedures with a mixture of full and quick channel access procedures may be adopted, as shown in FIG. 12. In this example, the LBT gap before Beam 1 transmission cannot accommodate full channel access procedure. In this case, quick channel access procedure may be adopted. Only the beams associated with idle LBT beams may be utilized for UL transmission. The UL beams associated with non-idle LBT beams may not be used for UL transmission and the UE may drop the UL data or hold the data until the next successful LBT occasion on the associated beam.

Type D3 LBT: Interlaced Hybrid Channel Access Procedure with Grouped LBT Beams

Figure 13:
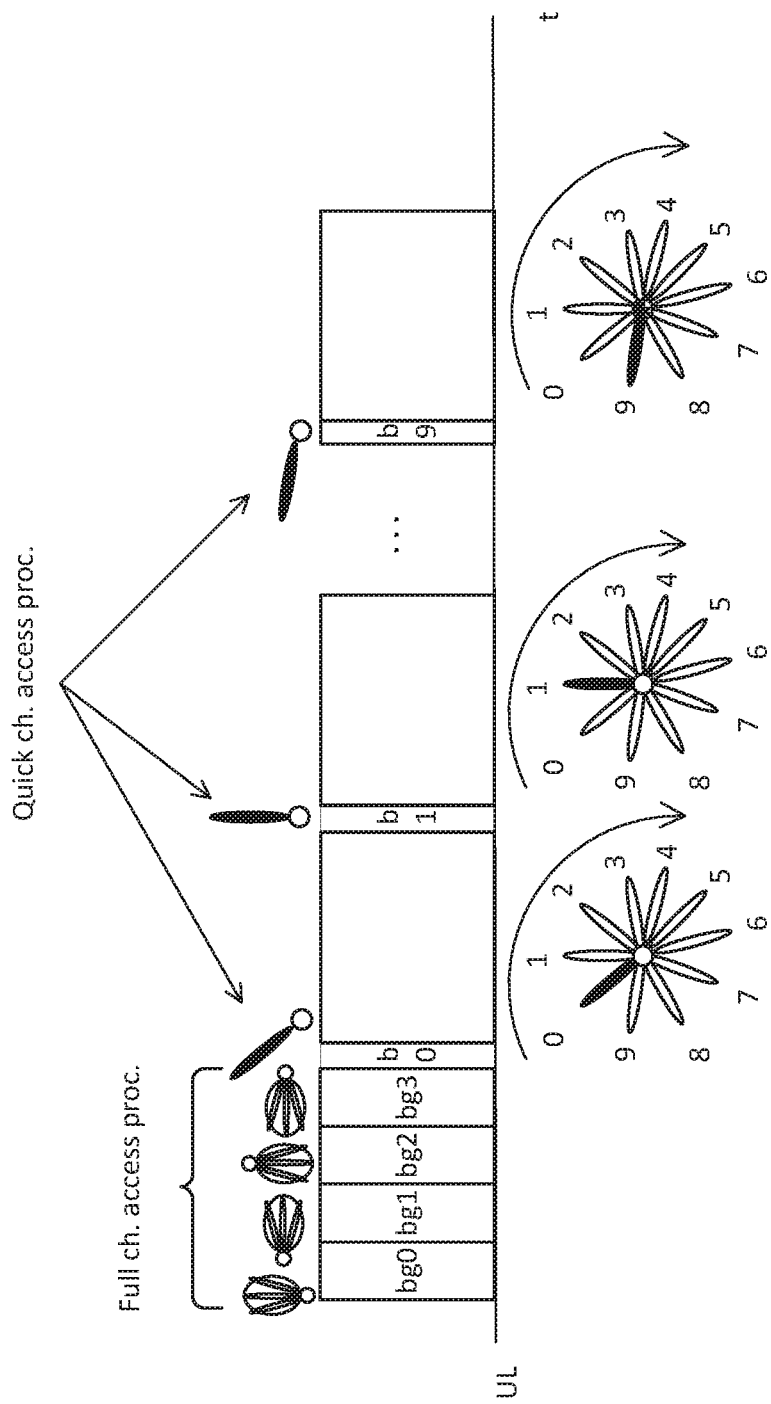
FIG. 13 is a timing diagram for an example Type D3 LBT interlaced hybrid channel access procedure with grouped LBT beams.

A full channel access procedure may be used with a wider LBT beam which may contain multiple narrow LBT beams based on the spatial relationship, which is followed by quick channel access procedure with narrow LBT beams in the LBT gap prior to each UL beam transmission as shown in FIG. 13. It is also possible to perform full channel access procedure prior each individual narrow beam depending on the time duration or even a mixture between full and quick channel access procedures. The beam is considered idle if the latest channel sensing prior to the UL transmission is performed successfully even if the full channel access procedure for the wide beam is not successful.

Type D4 LBT: Combined Contiguous and Non-Contiguous Channel Access Procedures

In some situation, the UL transmission burst may be combinations of contiguous and non-contiguous beams. For this case, any of the aforementioned procedures may also be adopted depending on which subset of LBT beams used for channel sensing.

Configuration and Signaling for LBT Beam

In mmWave band, the UL transmissions are based on narrow directional beams to compensate the severe path loss. When operating in the unlicensed carrier, the UE has to perform LBT to assess the channel medium availability and avoid interfering with other concurrent transmissions. To reduce the UE power consumption and enhance the coexistence with other incumbent systems of the unlicensed carrier, an embodiment of beam-based LBT assisted by gNB may be used. Specifically, the assistance level may be a full indication of beams form the gNB that the UE will perform LBT with the LBT type, or partial assistance in which gNB provides the UEs with some configurations or implicit indication that help UEs to autonomously identify the LBT beams and the LBT type. The details of fully and partially assisted beam based LBT are described next.

For fully assisted beam based LBT, the gNB explicitly indicates the beams on which the LBT is performed based on the scheduling type for UL transmissions. For example, gNB may indicate the LBT beam(s) based on the association with sounding reference signal (SRS) resource configured or signaled for SRS transmissions on UL or based on the association with the DL RS, such as primary synchronization signal (PSS), secondary synchronization signal (SSS), or demodulation reference signal (DMRS) of the synchronization signal block (SSB). The association with DL-RS or SRS may be used to determine the LBT beams in the following cases:

DL-RS is used to indicate the LBT beam when there is DL Tx/Rx beam association for a UE, i.e., the UE is able to determine a LBT beam based on DL-RS, for example a DL-RS ID or a DL-RS beam indication configured or signaled by the gNB.

SRS is used implicitly to indicate a LBT beam, i.e., the UE determine its LBT beam based on SRS resource configuration. In this case, gNB may implicitly indicate the LBT beam(s) by using configured or signaled SRS resources.

Such mechanism may be performed by one of the following signaling mode depending UL scheduling type.

To indicate a single beam for performing LBT, one of the options in Table 2 of the Appendix may be adopted. Such signal may be transmitted on Pcell in carrier aggregation (CA) deployment or PScell in dual connectivity (DC) deployment in any DL data burst proceeding a successful LBT.

If a UE is configured with higher layer parameters such as LBT-SpatialRelationInfo (e.g. Radio Resource Control (RRC) configured), for example, set to SSB, periodic channel state information reference signal (P-CSI-RS), semi-persistent channel state information reference signal (SP-CSI-RS), or aperiodic channel state information reference signal (AP-CSI-RS), the UE shall perform the LBT on beams with the same spatial domain reception filter used for the reception of SSB, P-CSI-RS, SP-CSI-RS, or AP-CSI-RS. In other words, the UE shall perform the LBT with the Rx beams for the reception of SSB, P-CSI-RS, SP-CSI-RS, or AP-CSI-RS.

If the UE is configured with higher layer parameters such as LBT-SpatialRelationInfo (e.g. RRC configured), for example, set to P-SRS SP-SRS, or AP-SRS, the UE shall perform the LBT on beams with the same spatial domain reception filter used for the transmission of P-SRS SP-SRS, or AP-SRS. In other words, the UE shall perform the LBT on Rx beams with the same spatial directions of those Tx beams used for the transmission of P-SRS SP-SRS, or AP-SRS.

Moreover, for gNB assisted beam based LBT, the gNB may configure or signal the following parameters for beam based LBT for contiguous and non-contiguous beams transmission.

LBT Gap

A UE needs a LBT gap for conducting an LBT depending on the LBT type to be performed. These LBT gaps may be configured by RRC message or signaled by down link control information (DCI), e.g. LBT_gap, which defines LBT duration. It may be the same for all beams. It may be different depending on the LBT beam. In this case, a parameter such as LBT_gap_list with LBT beam IDs or LBT beam indication may be used. The LBT gap location may be determined based on particular rule from the beginning of UL grant based on service requirements. For example, in case of single LBT gap is configured for all the LBT beams, LBT_gap may be set to x OFDM symbols/slots, which means that the UE starts the channel access procedure x OFDM symbols/slot prior to the UL grant. If the LBT gap duration is set differently for each LBT beam, then LBT_gap_list may be used to indicate the {x, LBT beam ID}.

If x is equal to a positive value, then x OFDM symbols/slots prior to UL grant are dedicated to conduct LBT, e.g., as shown in FIG. 30.

When x is a positive value, if UE is configured by higher layers to receive a PDCCH, or a PDSCH, or a CSI-RS, prior to configuring LBT gap, in a set of symbols within the x LBT gap OFDM symbols/slots, the UE does not receive those configured data or reference signals.

When x is a positive value, if the UE receives a DL grant, e.g., through DCI format 1_0 or DCI format 1_1 for example, indicating to PDSCH or CSI-RS in a set of symbols within the x LBT gap OFDM symbols/slots, the UE receives them and performs either a full or a quick channel procedure within the remaining LBT gap OFDM symbols/slots. Moreover, if remaining duration between the last OFDM symbol carrying PDSCH or CSI-RS and the scheduled/configured UL grant is less than particular threshold value depending on UE capabilities, then UE may not conduct LBT and switch directly from DL to UL, or the UE may switch from performing full channel access procedure to quick channel access procedure.

When x is a positive value, if the UE is configured by higher layers to transmit a periodic SRS, or a PUCCH, or a PUSCH, or a PRACH, prior to configuring LBT gap, in a set of symbols within the x LBT gap OFDM symbols/slots, the UE is not expected to cancel the transmission of the periodic SRS, or the PUCCH, or the PUSCH, or the PRACH. Instead, the UE shifts the x LBT gap OFDM symbols/slots before those UL data/signals configured by high layer and conduct a single LBT.

When x is a positive value, if the UE is signaled transmit a SRS, or a PUCCH, or a PUSCH, or a PRACH, e.g., DCI format 0_0, DCI format 0_1, DCI format 1_0, DCI format 1_1, or DCI format 2_3 for example, in a set of symbols within the x LBT gap OFDM symbols/slots, the UE is not expected to cancel the transmission of the SRS, or the PUCCH, or the PUSCH, or the PRACH. Instead, the UE shifts the x LBT gap OFDM symbols/slots before those UL data/signals configured by high layer and conduct a single LBT. In the example of FIG. 31, the UE receives DCI carrying UL grant that overlap with the initially configured LBT gap. In this case, the UE may shift the LBT gap such that the grant UL resources may be exploited to transmit the UL data or reference signal.

On the other hand, when x is equal to a negative value, then x OFDM symbols/slots out of the UL grant are dedicated to conduct LBT as shown in FIG. 32. In other words, the UL grant includes the LBT gap.

When x is equal to a negative value, if UE is configured by higher layers to receive a PDCCH, or a PDSCH, or a CSI-RS, or a SSB, prior to configuring LBT gap, in a set of symbols within the x LBT gap OFDM symbols/slots, the UE does not receive those configured data or reference signals.

When x is equal to a negative value, the UE does not expect to receive DL grant, e.g., through DCI format 1_0 or DCI format 1_1 for example, indicating to PDSCH or CSI-RS in a set of symbols within the x LBT gap OFDM symbols/slots.

When x is equal to a negative value, if the UE is configured by higher layers to transmit a periodic SRS, or a PUCCH, or a PUSCH, or a PRACH, prior to configuring LBT gap, in a set of symbols within the x LBT gap OFDM symbols/slots, the UE is not expected to cancel the transmission of the periodic SRS, or the PUCCH, or the PUSCH, or the PRACH. Instead, the UE shifts the x LBT gap OFDM symbols/slots before those UL data/signals configured by high layer and conduct a single LBT.

When x is equal to a negative value, if the UE is signaled to transmit a SRS, or a PUCCH, or a PUSCH, or a PRACH, e.g., DCI format 0_0, DCI format 0_1, DCI format 1_0, DCI format 1_1, or DCI format 2_3 for example, in a set of symbols within the x LBT gap OFDM symbols/slots, the UE is not expected to cancel the transmission of the SRS, or the PUCCH, or the PUSCH, or the PRACH. Instead, the UE shifts the x LBT gap OFDM symbols/slots before those UL data/signals configured by high layer and conduct a single LBT.

Moreover, the LBT gap may be signaled DCI, e.g., DCI format 0_1, by introducing 1 bit to distinguish between whether the UL grant will be used for UL data transmission or for performing LBT. The LBT gap may be indicated via a UE-specific search space using cell radio network temporary identifier (C-RNTI). Alternatively, the LBT gap may be sent on the common search space, wherein a listen before talk gap radio network temporary identifier (LBT_gap_RNTI) may be used to signal the LBT gap to multiple UEs that are assigned with LBT_gap_RNTI.

When LBT gap is dynamically signaled through DCI, by aforementioned methods for examples or any other methods, if UE is configured by higher layers to receive a PDCCH, or a PDSCH, or a CSI-RS in a set of symbols within the indicated LBT gap OFDM symbols/slots by DCI, the UE does not receive those configured data or reference signals.

Moreover, for dynamically signaled LBT gap, if the UE receives DL grant, e.g., through DCI format 1_0 or DCI format 1_1 for example, indicating to PDSCH or CSI-RS in a set of symbols within the indicated LBT gap OFDM symbols/slots by DCI, the UE receives them and perform either full or quick channel procedure within the remaining LBT gap OFDM symbols/slots. Moreover, if remaining duration between the last OFDM symbol carrying PDSCH or CSI-RS and the scheduled/configured UL grant is than particular threshold value depending on UE capabilities, then UE may not conduct LBT and switch directly from DL to UL.

Further, for dynamically signaled LBT gap, if UE is configured by higher layers to transmit a periodic SRS, or a PUCCH, or a PUSCH, or a PRACH in a set of symbols within the indicated LBT gap OFDM symbols/slots by DCI, the UE is not expected to cancel the transmission of the periodic SRS, or the PUCCH, or the PUSCH, or the PRACH. Instead, the UE shifts the x LBT gap OFDM symbols/slots before those UL data/signals configured by high layer and conduct a single LBT.

Furthermore, for dynamically signaled LBT gap, if the UE is signaled to transmit a SRS, or a PUCCH, or a PUSCH, or a PRACH, e.g., DCI format 0_0, DCI format 0_1, DCI format 1_0, DCI format 1_1, or DCI format 2_3 for example, in a set of symbols within the indicated LBT gap OFDM symbols/slots by DCI, the UE is not expected to cancel the transmission of the SRS, or the PUCCH, or the PUSCH, or the PRACH. Instead, the UE shifts the x LBT gap OFDM symbols/slots before those UL data/signals configured by high layer and conduct a single LBT.

On the other hand, if no RRC message is provided to the UE to configure LBT or DCI to signal LBT gap, the UE is expected to start conducting LBT whenever there is data/reference signal, e.g., SRS, to be transmitted until the configured or granted UL resources. If the channel is declared idle prior to the configured or granted UL resources, the UE is expected to continue sensing the channel by performing multiple quick channel access procedures.

LBT Type

An LBT type may be Configured by higher layer parameters such as LBT-ULType (e.g. RRC configuration), for example, LBT-ULType may set to Type C1, C2, C3, C4, C5, C6, C7, D1, D2, D3 or D4 LBT UL channel access procedure. It may be transmitted in as a common RRC message or it may be specific RRC message dedicated for a specific UE.

An LBT type may be signaled by the UL grant DCI, e.g., DCI format 0_1 as an example, for scheduling a PUSCH/PUCCH transmission. To this end, a new field of 4 bits, as an example, may be used to select one or more of the different types of channel access procedures described herein for LBT on the UE side. A table of all beam based LBT types may be configured by RRC parameters, and a subset of it may be indicated by MAC CE, e.g., selecting only two types of LBT types. In this case, one bit in the DCI is sufficient to signal the LBT type dynamically to the UE.

Reservation Data

Reservation data used for a UE to reserve the UL channel access after a successful LBT may be configured or signaled as follows in a number of ways. A UE may be configured by higher layer parameters such as LBT_ResData_enable (e.g. RRC configuration), which indicate that UE may transmit reservation data on UL beams associated with idle LBT beams on the resources configured or scheduled for UL transmission. For time resources, the UE may transmit the reservation data from the end of its LBT gap to the beginning of UL transmission.

Alternatively, the UE may be signaled to transmit reservation data prior to the configured or scheduled UL transmission. Thus, a new field of 1 bit may be used in UL grant DCI(s) to indicate whether reservation data will be transmitted or not prior to the granted UL resources.

If Reservation data is enabled, e.g., if LBT_ResData_enable is "1", then the UE may transfer its own reservation data, as configured by its higher layer, or may transfer known reservation data configured via RRC or indicated via DCI by gNB. The known reservation data may be used by other devices for identifying device type under a certain service provider on the shared unlicensed spectrum.

Partially assisted beam based LBT may be used in the absence of the fully assisted beam based LBT. In this approach, a set of default configurations (e.g. preconfigured or RRC configured) may be used to assist the UE in identifying the LBT beam. These default configurations may include, but not limited to, default RS associated with the LBT beam, default LBT type, and default LBT gap duration.

Potential default LBT beams, e.g., spatial directions to conduct LBT, may be adopted by the UE the absence of configured/signaled LBT beams or the UE needs more time to decode the messages carrying the LBT beams information and details.

For example, for PRACH transmission, e.g., messages 1 and 3 for four steps RACH procedure and message 1 for two steps RACH procedure, the UE may perform the LBT on beams with the same spatial domain reception filter used for the reception of SSB, CSI-RS associated with, but not limited to, handover/beam failure recovery triggering, for example, or PDCCH order. In other words, the UE may perform the LBT with the Rx beams for the reception of SSB or PDCCH order.

If the time duration between indicating/configuring the LBT spatial relation and the time to apply the spatial relation is less than certain threshold for a UE to decode the message and deploy the LBT spatial relation configurations, the UE may conduct LBT on beams that have spatial relationship with the DMRS of PDCCH carrying the UL grant for a PUSCH, or PUCCH, or activating SRS. In other words, the UE deploy the same receive beam used for DMRS reception to perform LBT. Alternatively, the UE may conduct LBT on beams that have spatial relationship with the DMRS of PDCCH carrying the RRC PDSCH that configures grant free UL resources, e.g. type A, or a periodic SRS, or a PUCCH, or a PUSCH. Further, the UE may conduct LBT on beams that have spatial relationship with the DMRS of PDCCH carrying the MAC-CE PDSCH that configures grant free UL resources, e.g. type B, or a semi persistent SRS.

LBT at gNB Side

Procedures to Perform Beam Specific LBT at gNB

Performing the beam-based LBT at the gNB with collocated TRPs is more challenging due to the large number of beams that may be supported at the gNB side. It is very challenging for gNB to listen on specific time-frequency resources on a particular beam while transmitting on all other beams on the same time-frequency resources due to inevitable self-interference. Therefore, several procedures are proposed herein to perform the beam-based LBT at the gNB and necessary signaling to support such operation with minimum impact on UE in terms of power consumption.

If a gNB transmits a down link burst consisting of SSBs, PDCCH, physical down link shared channel (PDSCH) and/or reference signals (RSs) such as CSI-RS on a beams set C, it is proposed herein to use one or combination of the following options to perform LBT at the gNB side. For simplicity of the illustration, an example solution using SSBs burst of subcarrier spacing of 120 KHz is used, because it is more challenging than DL data, control, and RS due to its restricted timing, periodicity, etc. However, the solutions are applicable for any transmitted burst consists of transmissions over multiple beams.

Option 1: Full Channel Access Procedure Performed at the Beginning of Each Slot

To reserve few orthogonal frequency division multiple access (OFDM) symbols, LBT gap, the DL full channel access procedures may include, but not limited to, for example, several deterministic channel sensing occasions, random sensing duration or both prior to the beginning of the slot. In a LBT gap, a gNB simultaneously senses the channel with LBT beams within the slot. Therefore, regardless the number of beams used within the slot, a LBT gap duration of $$\max_{c_i \in C_{slot}} \{\eta_{c_i}\}$$

is reserved, where $C_{slot}$ is the set of beams used within the slot, and $n_{c_i}$ is beam specific LBT gap in within which the full channel access procedure is applied. It may depend on several factors such as network loading status, the number of fixed sensing durations or slots, the number of random sensing durations or slots, the latency and quality requirements on that beam. If DL full channel access procedure for any beam $c_i$ has not successfully completed in this dedicated LBT gap, then this beam is declared non-idle.

Figure 14:
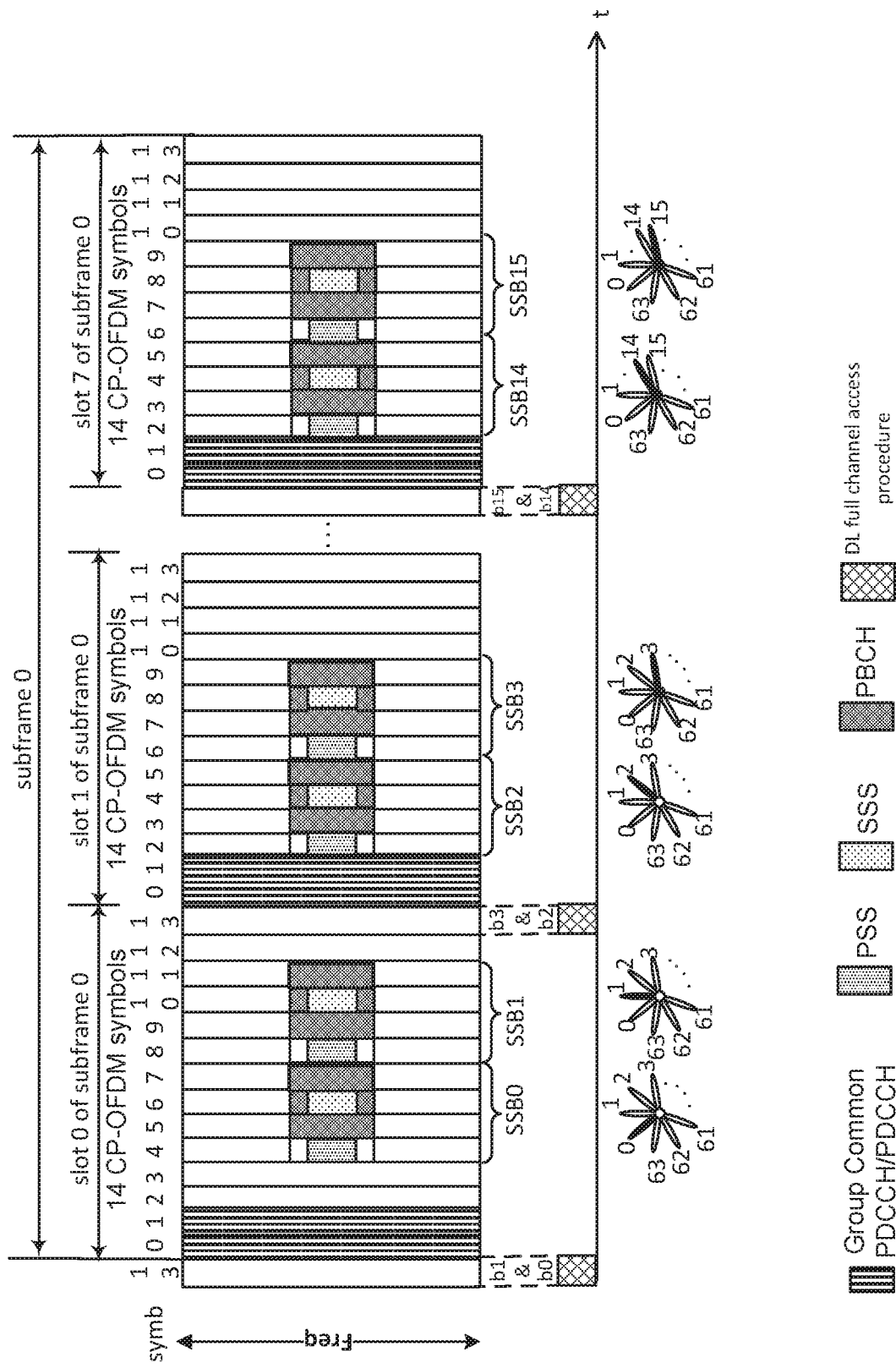
FIG. 14 is a timing diagram for an example full channel access procedure performed at the beginning of each slot.

FIG. 14 illustrates an example in which two beams corresponding to SSBs are only used in each slot is shown in FIG. 14. In this case, the last OFDM symbol, i.e. OS 13 as an example, in each slot is reserved to perform DL full channel access procedure on the beams used in the next slot. In this case, no DL data or RS is transmitted in this OFDM symbol.

Option 2: Full Channel Access Procedure for all Beams at the Beginning of MCOT

Figure 15:
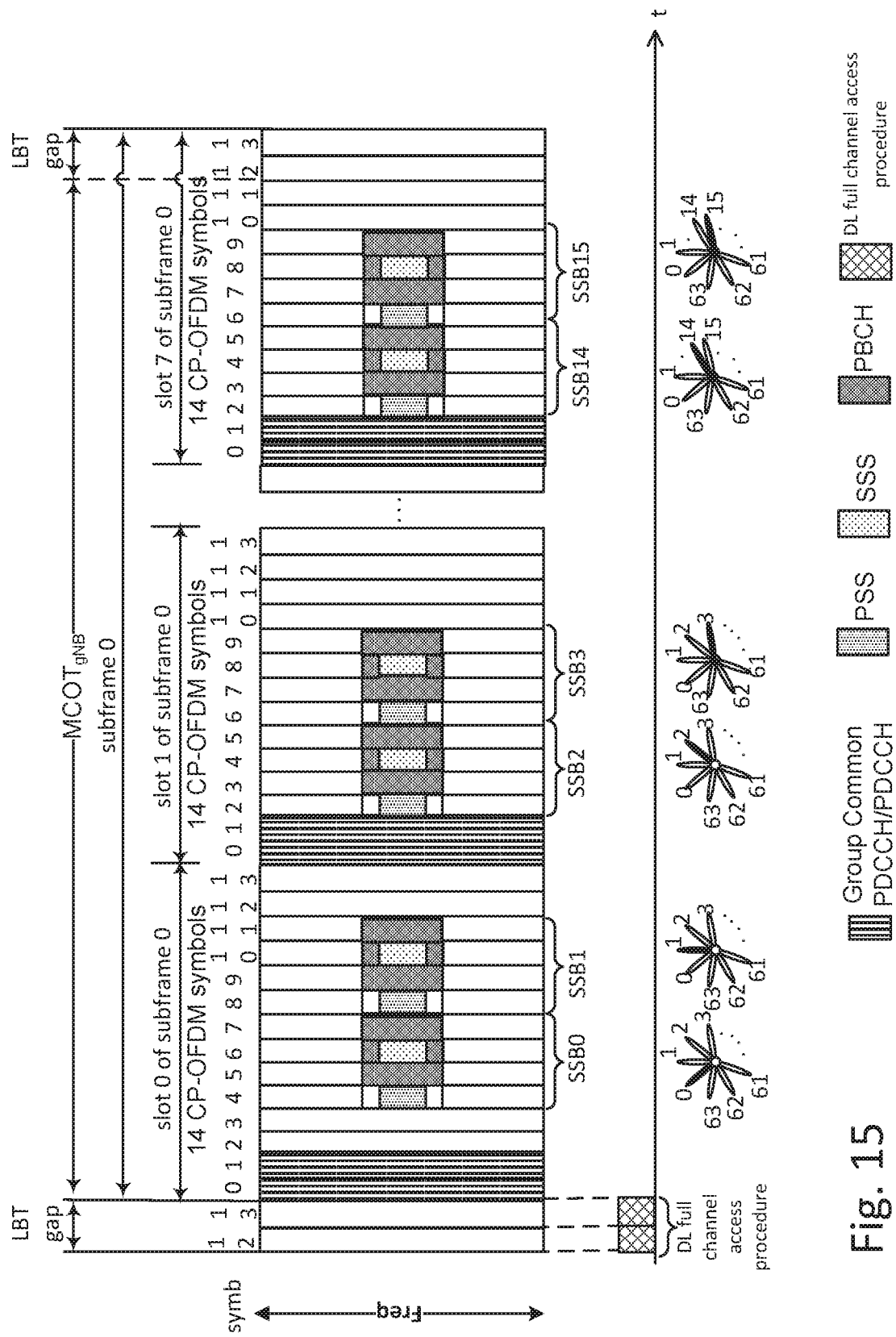
FIG. 15 is a timing diagram for an example full channel access procedure for all beams at the beginning of gNB's MCOT.

To reduce the wasted resources due to LBT gap, the gNB may perform a DL full channel access procedure for all the beams that may be used to determine the gNB MCOT. Depending on gNB capabilities, the gNB may simultaneously sense the channel using DL full channel access procedure. For example, in FIG. 15, gNB may perform channel sensing with all LBT beams within its MCOT, e.g., 16 beams, prior to the beginning of its transmission. To avoid frame boundary synchronization issues, the beginning of gNB MCOT may be at slot or subframe boundary. As illustrated in FIG. 15, gNB MCOT may start only at the borders of subframe and its LBT gap is performed in the last few OFDM symbols in the previous subframe, as an example. Finer granularity in slot or even OFDM symbols may also be applied depending the channel sensing algorithms, as well as the numerology used.

In this embodiment, a MCOT is defined for a gNB and is denoted by $MCOT_{gNB}$. However, each beam may have a different beam $MCOT_{c_i}$, where $c_i$ denotes the beam i. This means that gNB may not occupy all the beams for the duration of $MCOT_{gNB}$, which may be equal to the maximum of $\{MCOT_{c_0}, MCOT_{c_1}, \ldots, MCOT_{c_N}\}$. In this case, gNB may not sense the channel with LBT on the beam with its $MCOT_{c_i}$ less than $MCOT_{gNB}$ until end of the transmission on the beam with the maximum $\{MCOT_{c_0}, MCOT_{c_1}, \ldots, MCOT_{c_N}\}$ where N is the number of beams in the set C. For example, if gNB performs successful DL full channel access procedure on all beams to be transmitted in subframe 0. For simplicity, it is assumed that beam 0 has the shortest beam $MCOT_{c_0}$ of 1 slot while all other beams have equal $MCOT_{c_i}$, (i≠0), e.g., the time duration of 8 slots minus the last two OFDM symbols of slot 7 as shown in FIG. 15. Once $MCOT_{c_0}$ of beam 0 expires, gNB may not use beam 0) for either DL transmission or LBT channel sensing until all the MCOTs of all beams expire.

Option 3: Hybrid Channel Access Procedures with Full and Quick Procedure

To enhance resources utilization and fully exploit that beam MCOT differs from one LBT beam to another, combined DL full and quick channel access procedures may be applied herein. The quick channel access procedure may be accomplished in a duration shorter than the full channel access procedure. Specifically, gNB may perform DL full channel access procedure on the LBT beams. Within the maximum MCOT among all the LBT beams, gNB may perform DL quick channel access procedure for LBT beams with DL full channel access procedure failed.

To achieve this, the gNB may cease transmission on all beams at the end maximum beam MCOT duration.

Further, the gNB may continue transmission on the beams with successful DL quick channel access procedure with gap to allow DL full channel access procedure to be performed at the end of the maximum beam MCOT.

Figure 16:
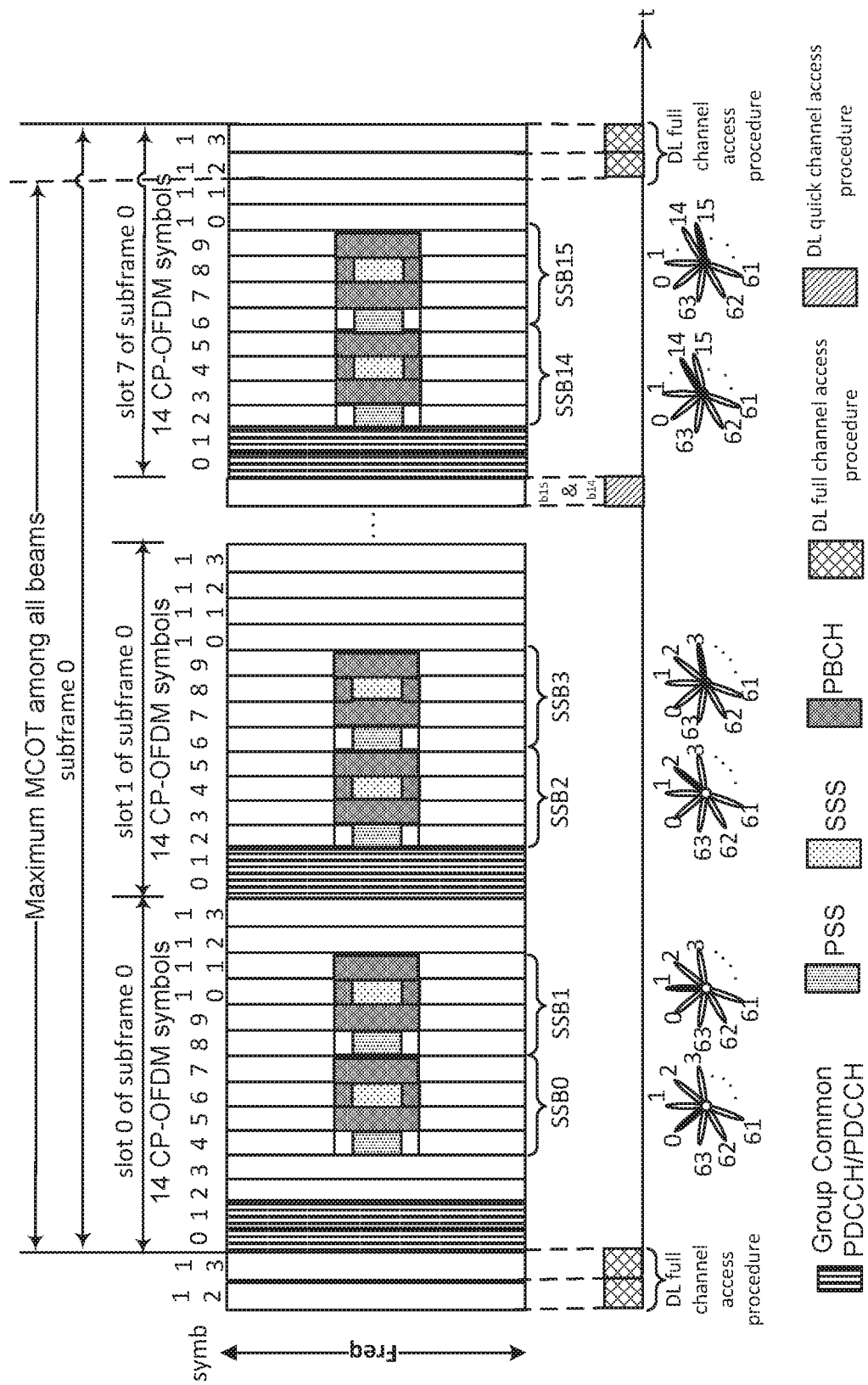
FIG. 16 is a timing diagram for example hybrid channel access procedures.

For example, as shown in FIG. 16, DL full channel access procedure is performed in OFDM symbols 12 and 13 prior to subframe 0 and the results in that channel sensing is idle for all LBT beams except LBT beams 14 and 15. Moreover, OFDM symbol 14 in Slot 6 of subframe 0 is configured for DL quick channel access procedure for the beams 14 and 15, as an example herein. If the channel is idle, then gNB may transmit until the end of the maximum beam MCOT among all the beams.

Figure 17:
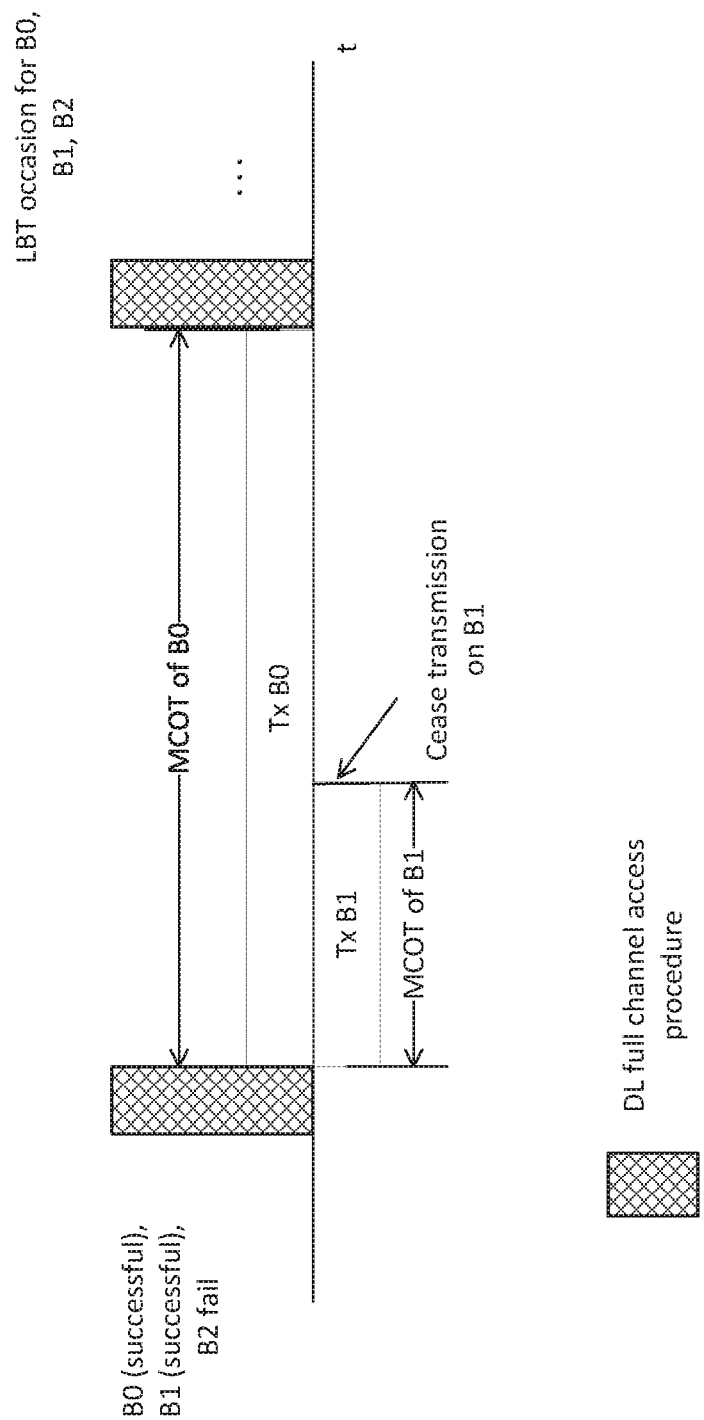
FIG. 17 is a timing diagram for an example full channel access procedure with the periodicity equal to the maximum beam MCOT.

To further illustrate the basic concepts of the herein proposed solutions, it is exemplified that gNB has three LBT beams B0, B1 and B2, with B0 having the maximum beam MCOT. The full channel access procedure is performed with the periodicity equal to the duration of the maximum MCOT among all the beams, like beam MCOT of B0. FIG. 17 shows the case in which the full channel access procedure is performed successfully on Beams B0 and B1. Moreover, beam MCOT of B1 is shorter than beam MCOT of B0 is exemplified that gNB has to cease transmission on B1 in this case. In this scenario, gNB may not perform another channel sensing over B1 or B2 until the next LBT occasion.

Figure 18:
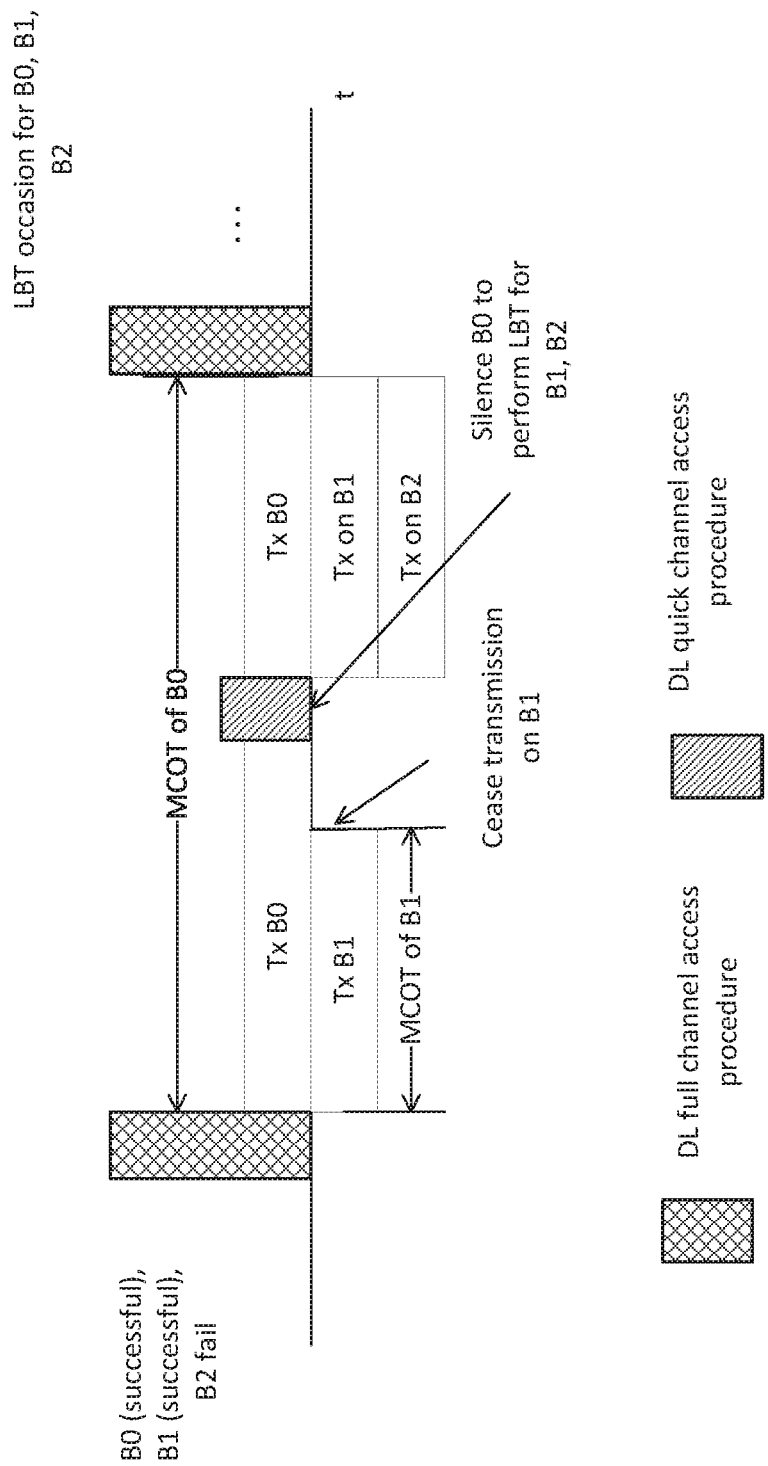
FIG. 18 is a timing diagram for an example full channel access procedure with the periodicity equal to the maximum beam MCOT and quick channel access procedure between two consecutive LBT occasions.

FIG. 18 shows the case in which quick channel access procedure is configured to sense the channel in the middle of two consecutive full channel occasions. Specifically, at the configured instance, all the active beams, e.g., B0, will be silenced and a quick channel sensing will be performed for non-active beams, e.g., B1 and B2. However, gNB may need to cease transmitting on all beams by the time of the next LBT occasion.

Figure 19:
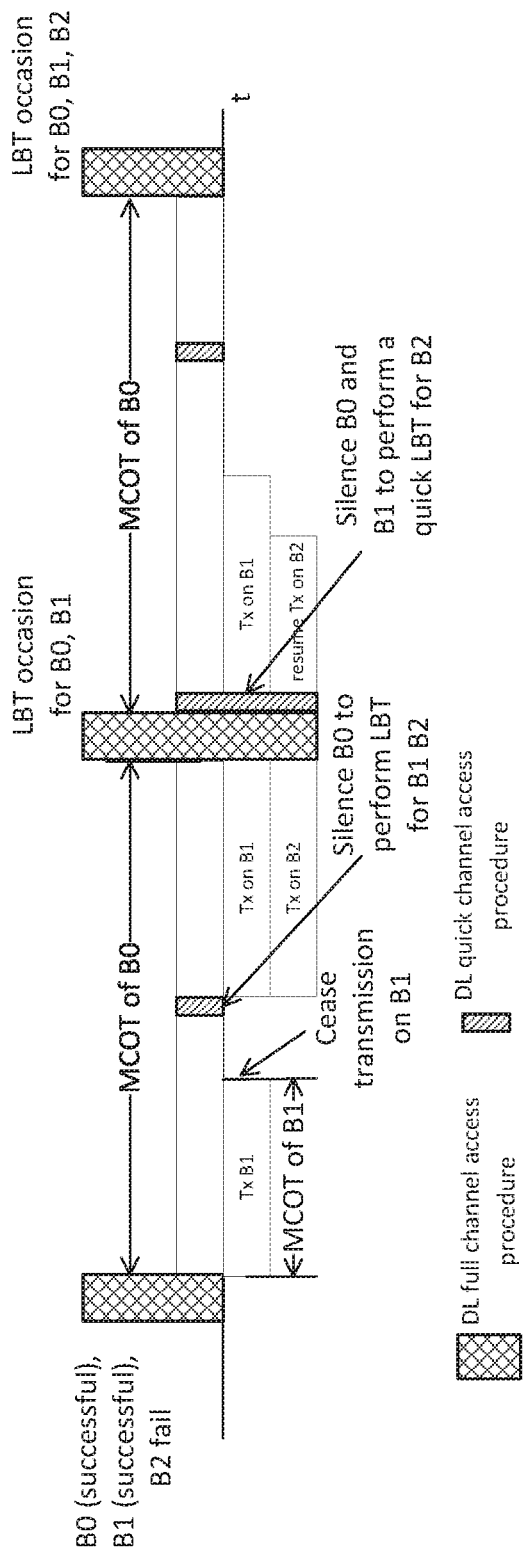
FIG. 19 is a timing diagram for an example of allowing the transmission across the maximum beam MCOT duration.

In FIG. 19, the transmission to cross the LBT occasion is exemplified. In this example, the transmission on B2 is not necessary to be ceased before the next LBT occasion. It will be silenced to allow the gNB to perform LBT at B0 and B1 and resume after that.

Alternatively, in the aforementioned embodiments, $MCOT_{gNB}$ may be equal to the minimum of $\{MCOT_{c_1}, MCOT_{c_1}, \ldots, MCOT_{c_N}\}$ where $MCOT_{c_i}$ is MCOT of $i^{th}$ transmit beam or any other function of the transmit beams' MCOT. In this case, gNB may transmit on the beams that are associated with LBT beams with successful LTB outcome. The periodicity of the LBT occasions are determined based on $MCOT_{gNB}$. The transmission on those beams with longer MCOT than $MCOT_{gNB}$ may be terminated at the end of $MCOT_{gNB}$.

The beams associated with LBT beams which are unavailable may not be used during the $MCOT_{gNB}$ until the next LBT occasion. Alternatively, gNB may attempt to access those beams during it initiated COT using the aforementioned procedures.

Figure 20:
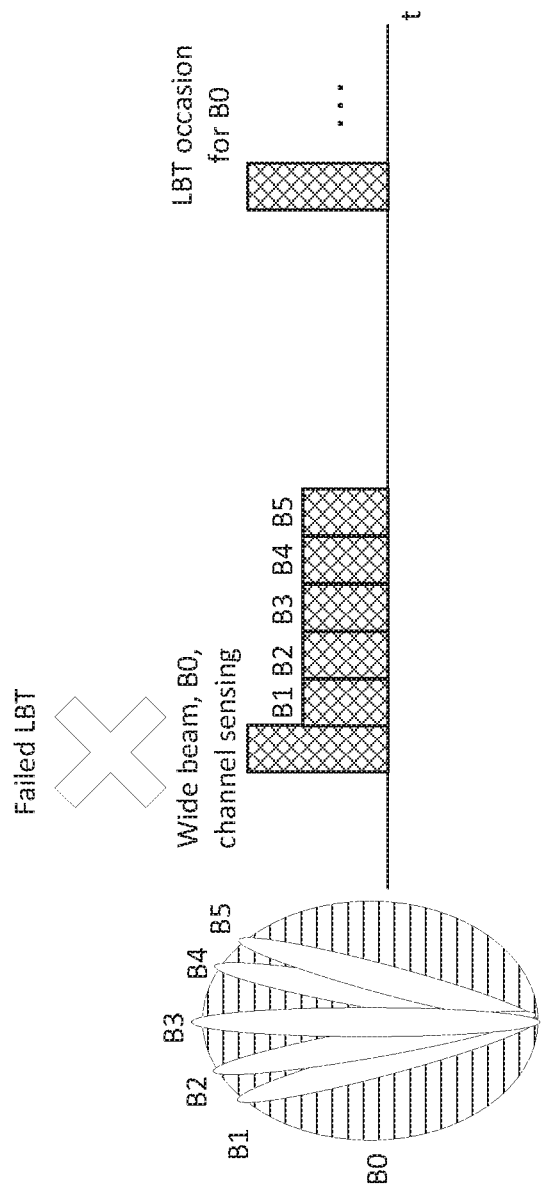
FIG. 20 is a timing diagram for an example of wide and narrow beams based LBT.

To reduce the overhead associated with performing LBT for multiple beams, gNB may group the narrow beams into wide beams and may use them to perform DL full or quick channel access procedure. Moreover, gNB may switch between full and quick channel access procedures depending on the outcome of the medium sensing. For example, if the LBT on the wide beams fail, gNB may switch to performing LBT on narrow beams of the grouped wide beam. For example, FIG. 20 shows a set of narrow beams (B1, B2, B3, B4, and B5) grouped in a wide beam B0 that is used by gNB to perform LBT. Upon failure of the LBT channel access procedure, gNB may perform the same or different, i.e., full or quick, channel access procedures for all or subset of the narrow LBT beams composing the wide LBT beam B0. In FIG. 20, it is illustrated that gNB use the same channel access procedure type for the narrow LBT beams. Moreover, FIG. 20 demonstrates that gNB performs LBT sequentially on the narrow LBT beams. However, capable gNBs may able to perform LBT on multiple narrow LBT beams at the same time, which can further reduce the overhead and latency. Since it is very challenging to perform LBT on a specific LBT beam while transmitting on other beams because of self-interference, gNB has to accomplish the LBT across all the LBT beams before begin transmitting on any of associated UL beams.

If gNB constructs multiple groups of narrow beams, then the aforementioned procedures, namely, Option 1: Full channel access procedure performed at the beginning of each slot, Option 2: Full channel access procedure for all beams at the beginning of MCOT and Option 3: Hybrid channel access procedures with full and quick procedure, may be adopted to access the channel. Specifically, in Option 1, the LBT occasions of all the beams groups are in the granularity of slot and may occur prior to the beginning of each slot. In Option 2, the LBT gaps occur in the granularity of gNB MCOT which is the maximum beam MCOT. While Option 3 allows gNB to perform different channel access procedures dynamically by muting the active beams group to allow the other beams group to conduct LBT to access the channel.

For beams carrying high priority signal or data such as beams used to transmit SSB or beams carrying very short transmissions with low or medium priority, gNB may not group them with other narrow beams carrying a long burst of low priority data to increase their chance of accessing the channel. In the example of FIG. 33, beams B1-B5 are set to carry a long burst of low priority data are grouped together to form wide beam B0. On the other hand, beam B6 is to carry higher priority signal or data compared with beams B1-B5. Therefore, in this embodiment, the LBT beam associated with B6 may not be grouped with other LBT beams.

As shown in FIG. 33, for example, LBT on B6 is conducted successfully while the channel is not available on the wide beam B0. Hence, gNB may occupy the channel to transmit the high priority DL burst followed by either full or quick channel access procedures to other narrow beams carrying low priority date that composing the wide beam B0.

Moreover, gNB may perform different channel access procedures. For instance, it may conduct full channel access procedure for the wide beam, e.g., B0, while conducting quick channel access procedure for the high priority beam. To this end, gNB may start sensing the channel for the wide beam before start sensing the channel for the beam with high priority data aiming to accomplish both channel access procedures of both B0 and B6 at the same time.

Furthermore, gNB may construct multiple of wide beams groups each is consists of beams based on the data priority to be transmitted on them. Different channel access procedures may be deployed on different wide beams and different start points may be deployed as well such that gNB may access all the beams associated with successful LBT at the same time.

Either narrow or wide LBT beams are adopted, gNB may conduct channel access procedure on predefined occasions as shown in FIG. 34, for example, with fixed time separation between any two consecutive LBT occasions which may be equal to maximum beam's MCOT. Though gNB may cease the transmission on any beam before the next LBT occasion, gNB may not attempt to conduct channel access procedure on this beam until the next LBT occasion. Those LBT occasions may be in the granularity of OFDM symbols, or slots, or subframes.

Alternatively, with narrow or wide LBT beams are adopted, gNB may conduct different channel access procedures dynamically as shown in FIG. 35 in which gNB may attempt to access the channel on particular beams while other beams are actively used for transmission. In this case, gNB may need to mute/silence those active beams, e.g., non-spatial orthogonal beams, to enable channel access procedure to be conducted on other beams.

Muting/silencing active/non-spatial orthogonal beams may be accomplished by using slot format indicator (SFI) when UE is configured to monitor DCI format 2_0, for example. To this end, gNB may use DCI format 2_0 to indicate that a set of OFDM symbols are flexible which may overwrite any previously configured or scheduled DL and hence those OFDM symbols may act as LBT gap. However, if gNB's beams/TRPs are sufficiently isolated such that self-interference is reasonably suppressed, then gNB may not mute/silence active beams, e.g., spatial orthogonal beams, while attempting to access other beams.

Though all the aforementioned methods are described for contiguous transmission across multiple beams, they may also be used for non-contiguous case because it may be treated as a special case of contiguous transmission burst on a single beam.

For example, a gNB may transmit some signals comprising of non-contiguous DL transmission bursts on different beams, for example discovery reference signals (DRS). Such DL transmission bursts may be different SSB on different beams with or without their associated RMSI. Other signals and channels may be transmitted in the DRS on beams used for SSBs. To sense the channel, the gNB may conduct one of the following procedures or a combination of them.

In the first procedure, the gNB may sense the channel on all the beams constructing the DL transmission burst and use reservation data to fill the time gaps between the different beams. Reservation data may be random signal not assigned to be received by any UE. Or signal/channel allocated for a UE or a group of UEs such CSI-RS for measurement, and/or control channel, and/or shared channel carrying data.

In the second procedure, the gNB may sense the channel on all or some of the beams constructing the DL transmission burst. Then the gNB may exploit the time gap prior to the DL burst transmission on any beam to sense the channel before pursing the transmission on that beam. Channel sensing may include full or quick channel access procedures.

Down Link LBT Duration Indication

With the LBT gap before/within the DL burst transmission, UE has to be indicated of those symbols used for LBT in case it is configured to monitor any signals such as DCI CORSET or other RS. The reason for this is that during LBT gap, the gNB with co-located TRPs is not able to transmit any signal, i.e., cannot transmit and receive at the same time-frequency simultaneously. Therefore, it is beneficial to notify the UE about these OFDM symbols to prevent the UE from doing any blind decoding attempts or reception of any signals that the UE was configured to receive.

The LBT gap can be indicated to UEs in the following signaling methods.

Static LBT Gap

In this case, the LBT gap may be signaled to the UE using RRC parameters such as LBT gap. If any other signals are configured overlapping with LBT gap, then UE is not expected to monitor them. If gNB uses both full and quick channel access procedures, then a new RRC parameter, LBT_gap_list, may be used to indicate the duration of the gap reserved for both channel access procedures. Moreover, a RRC parameter, LBT start list, may be used to indicate the start location of the LBT gap. It may be in terms of the number of OFDM symbols starting from the beginning of the subframe.

If the UE is configured by higher layers to receive a PDCCH, or a PDSCH, or a CSI-RS in the set of symbols of the slots or symbols that is indicated to be LBT period on DL, the UE does not receive those configured data or reference signals. In other words, LBT period overrides the other RRC configurations if overlapped in time.

If the UE receives DL grant, e.g., through DCI format 1_0, DCI format 1_1, for example, indicating to PDSCH or CSI-RS in the set of symbols of the slots or symbols that is indicated to be LBT period on DL, the UE receives the scheduled PDSCH or CSI-RS.

If the UE detects DCI format 2_0 indicating that set of OFDM symbols as DL or UL and one or multiple of those OFDM symbols are configured by higher layers as LBT period, then the UE is expected to receive/transmit any DL/UL, respectively, data or reference signals on those symbols.

Semi-Static LBT Gap

Depending on the network status, the LBT gap may be configured semi-statically. In this case, RRC or MAC CE can be used to reconfigure the LBT gap, duration and start location, which allows the UE to monitor any periodic and SP signals properly.

Dynamic LBT gap

For highly dynamic networks, the LBT gap may be adjusted dynamically. DCI may be used to signal the LBT gap. For example, the LBT gap may be transmitted in a UE-specific search space using UE's radio network temporary identifier (RNTI), such as C-RNTI, with a grant_LBT_switch 1-bit field to indicate whether the DL indicated grant is used for some data transmission or gNB will use it for performing LBT. For example, if this bit is equal to one, the UE is expected to receive DL data/RS on the indicated DL grant. If it is equal to zero, then UE is implicitly informed that it is expected not to perform any operation because the gNB is performing LBT during this grant.

Alternatively, listen before talk radio network temporary identified (LBT_RNTI) is proposed herein for common search space with a corresponding PDSCH to indicate the OFDM symbols reserved for performing LBT or group common PDCCH with LBT_RNTI. The UE should not perform any decoding/reception trials during those OFDM symbols.

An RNTI for LBT process, such as listen before talk slot frame indicator radio network temporary identified (LBT_S-FI_RNTI), may be used with LBT_SFI_PDCCH which is transmitted in the common search space, for example, to indicate the OFDM symbols reserved for performing LBT. The LBT_SFI_PDCCH may be transmitted on common or UE-specific search space. If in UE-specific search space, LBT_SFI_RNTI may be the same as C-RNTI. If in common search space, UEs configured with LBT_SFI_RNTI are expected to decode LBT_SFI_PDCCH to know the OFDM symbols reserved for LBT process.

Transmitting RRC, MAC CE, or DCI

Figure 21:
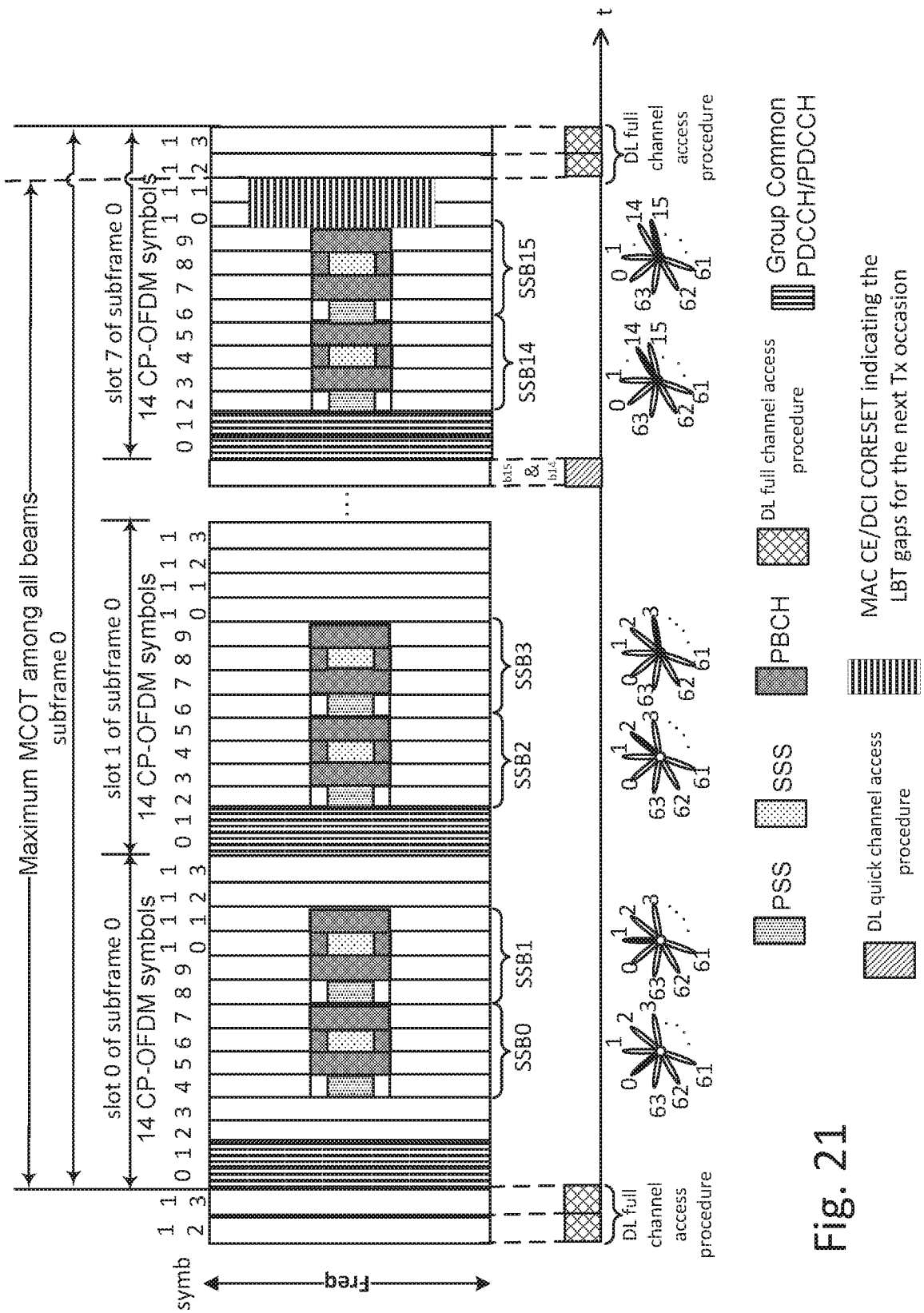
FIG. 21 is a timing diagram for an example of LBT gaps of a new Tx occasion before the end of a current Tx opportunity.

Either RRC, MAC CE or DCI for static, semi-static, or dynamic LBT gap, respectively, can be signaled on the Pcell in CA deployment. However, due to the lack of ideal backhaul in DC deployment, signaling the LBT gap has to be transmitted on the unlicensed carrier in a number of ways. An RRC message may be signaled once the connection is established in the PScell. MAC CE and DCI may be signaled in the last channel access occasion before applying the new LBT gap as shown in FIG. 21.

Herein, LBT beam may be defined as the reception beam pointing to particular spatial direction with certain configurations that a UE and/or gNB may use to sense the channel via quick or full channel access procedures before UL and/or DL transmissions on its associated beam, respectively, if LBT is conducted successfully. The following procedures may be used to associate the LBT beam with Tx beam.

Figure 29A:
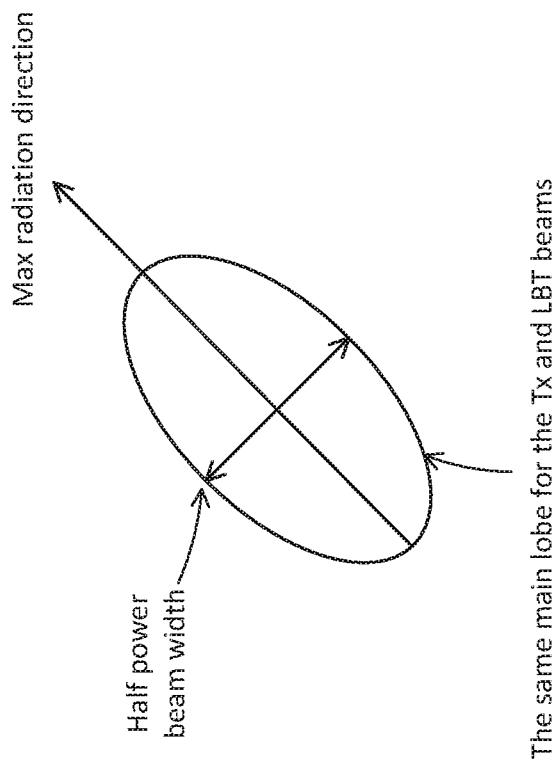
FIGS. 29A-29D show various association scenarios between LBT beam and transmit beam at UE and/or gNB.

For example, the LBT beam may be constructed by the UE and/or gNB such that it has the same coverage area/space of its associated transmission beam. For example, LBT beam's main lobe is as same as the main antenna lobe of the Tx beam, e.g. the same max radiation direction, half power beam width (HPBW), etc. as shown in FIG. 29A. A UE and/or gNB may adjust the receive gain of the LBT beam such that it has the same coverage area of the Tx beam with the configured/indicated Tx power.

Figure 29B:
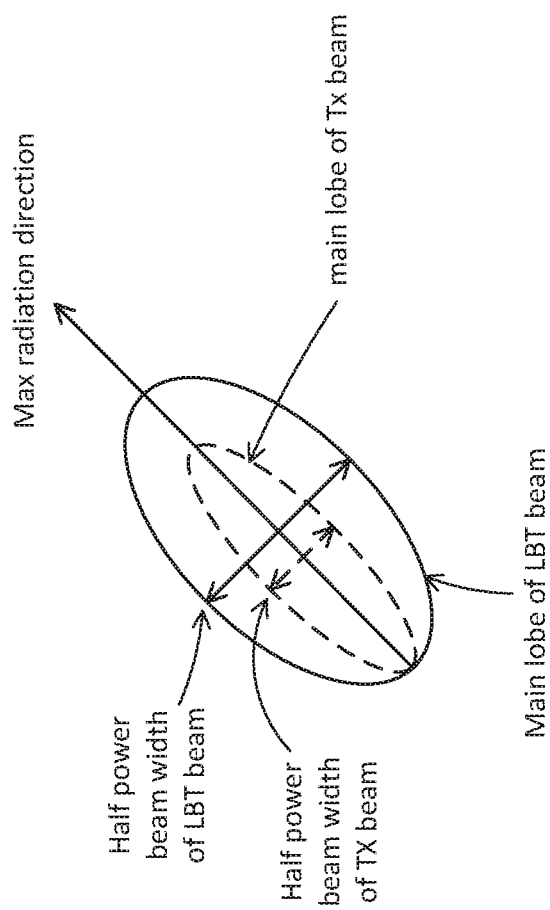
Figure 29C:
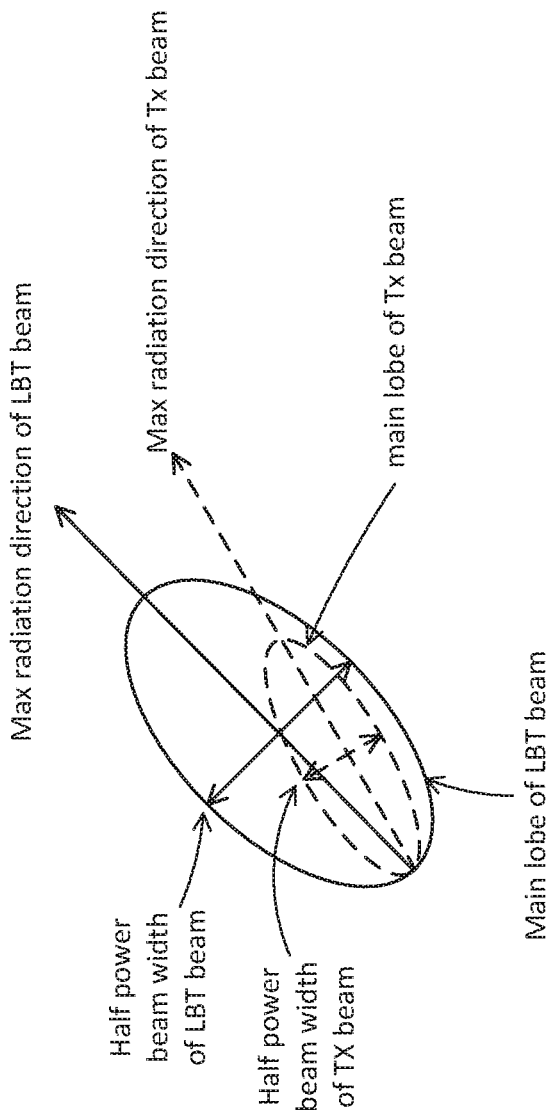

Alternatively, the LBT beam may be constructed by the UE and/or gNB such that its coverage area/space contains the coverage area of its associated Tx beam. For example, in FIG. 29B shows that the main lobes of both Tx and LBT beams have the same max radiation direction but HPBW of Tx beam is less than HPBW of the LBT beam. Moreover, the UE and/or gNB may adjust the receive gain of the LBT beam such that it has a larger coverage area than the Tx beam with the configured/indicated Tx power. Furthermore, max radiation direction of the Tx beam may be different than max radiation direction of the LBT as shown in FIG. 29C, for example. However, the coverage area/space of the Tx beam is still contained in the coverage area/space of its associated LBT beam.

Figure 29D:
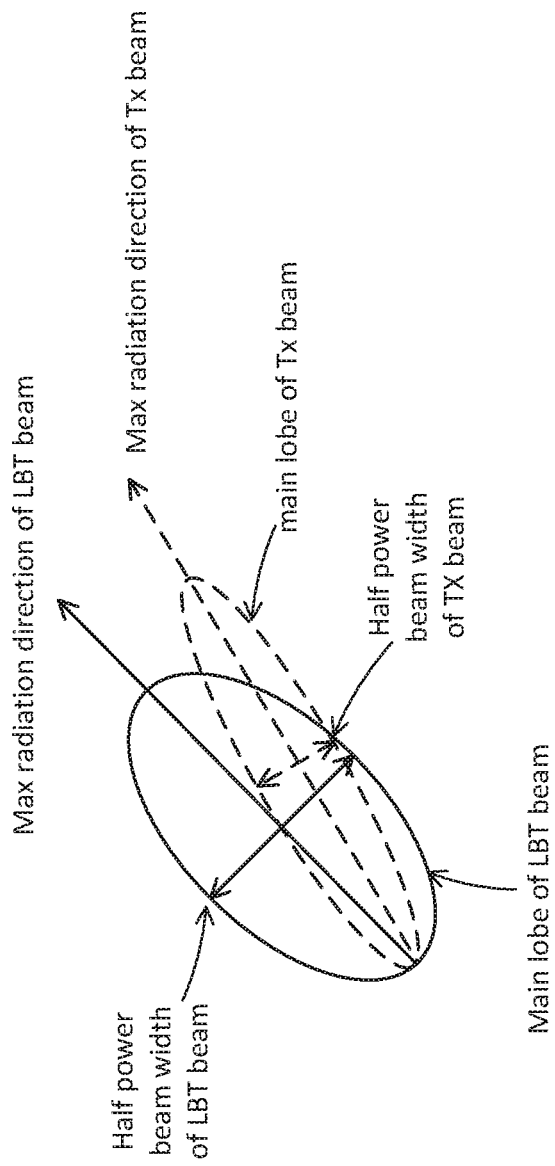

The coverage area/space of the Tx beam may be partially overlapped with the coverage area/space of its associated LBT beam as shown in FIG. 29D for example. The Tx beam may have same or different max radiation angle/HPBW of the LBT beam. Moreover, the coverage area of the Tx beam may be beyond the coverage area of the LBT beam. Such scenario may be of interest the transmission from UE and/or gNB goes over to distinct areas. In one of those areas, it may assume there are no other devices use the unlicensed band, hence no need to sense the channel in this area. In the second area, the unlicensed band may be shared with other devices, hence UE and/or gNB has to sense the channel in this area before conducting the transmission.

The LBT beam can be wide enough such that it may be associated with multiple Tx beams. For example, if the LBT beam is available, then all the associated transmission beams can be used. Moreover, the LBT beam can be wide. For example, an omni directional LBT beam may be used while the directional transmission beams are used.

LBT with Different Numerology Transmissions

In a new radio unlicensed (NR-U) system, a gNB may signal to the UE to abandon performing LBT before its UL transmission if such UL transmission is shortly conducted after a DL reception. For example, after the reception of the gNB transmission, the UE may directly access the channel as long its transmission burst duration is less than CCA duration.

Figure 22:
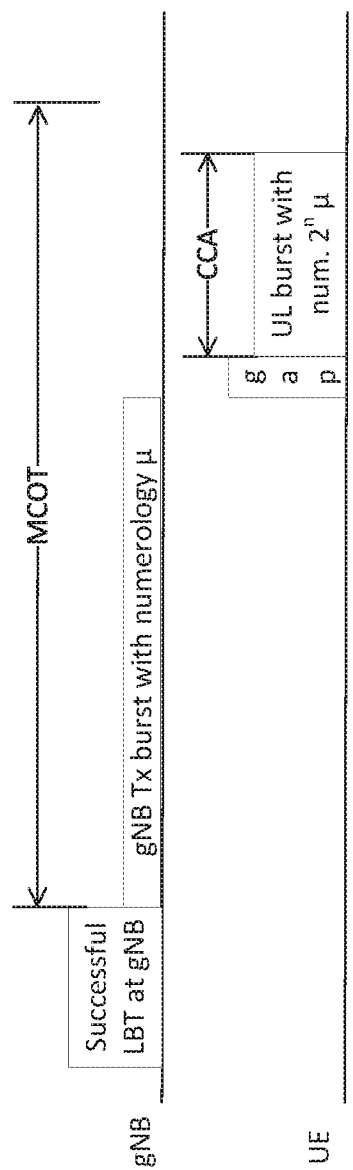
FIG. 22 is a timing diagram for an example of an uplink (UL) numerology change to fit its burst within CCA.

In this scenario, the UE may be able to operate on different numerologies. For example, after transmission burst dedicated to the UE with a particular numerology u, it may need to switch to a higher numerology $2^n\mu$ to send the required report or data burst as shown in FIG. 22. For capable UEs, such signals may be accomplished in a number of ways. For example, for periodic scheduling, the uplink numerology can be configured in RRC for this specific case. For semi-persistent scheduling, MAC CE can be used to command the numerology change. Since gNB knows the grant size and UE capabilities, it may signal to the UE about the new UL numerology through DCI command to activate it.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHZ, and the provision of new ultra-mobile broadband radio access above 6 GHZ. The flexible radio access is expected to consist of a new, non-backwards compatible radio access in new spectrum below 6 GHZ, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHZ, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few: All of these use cases and others are contemplated herein.

Figure 23:
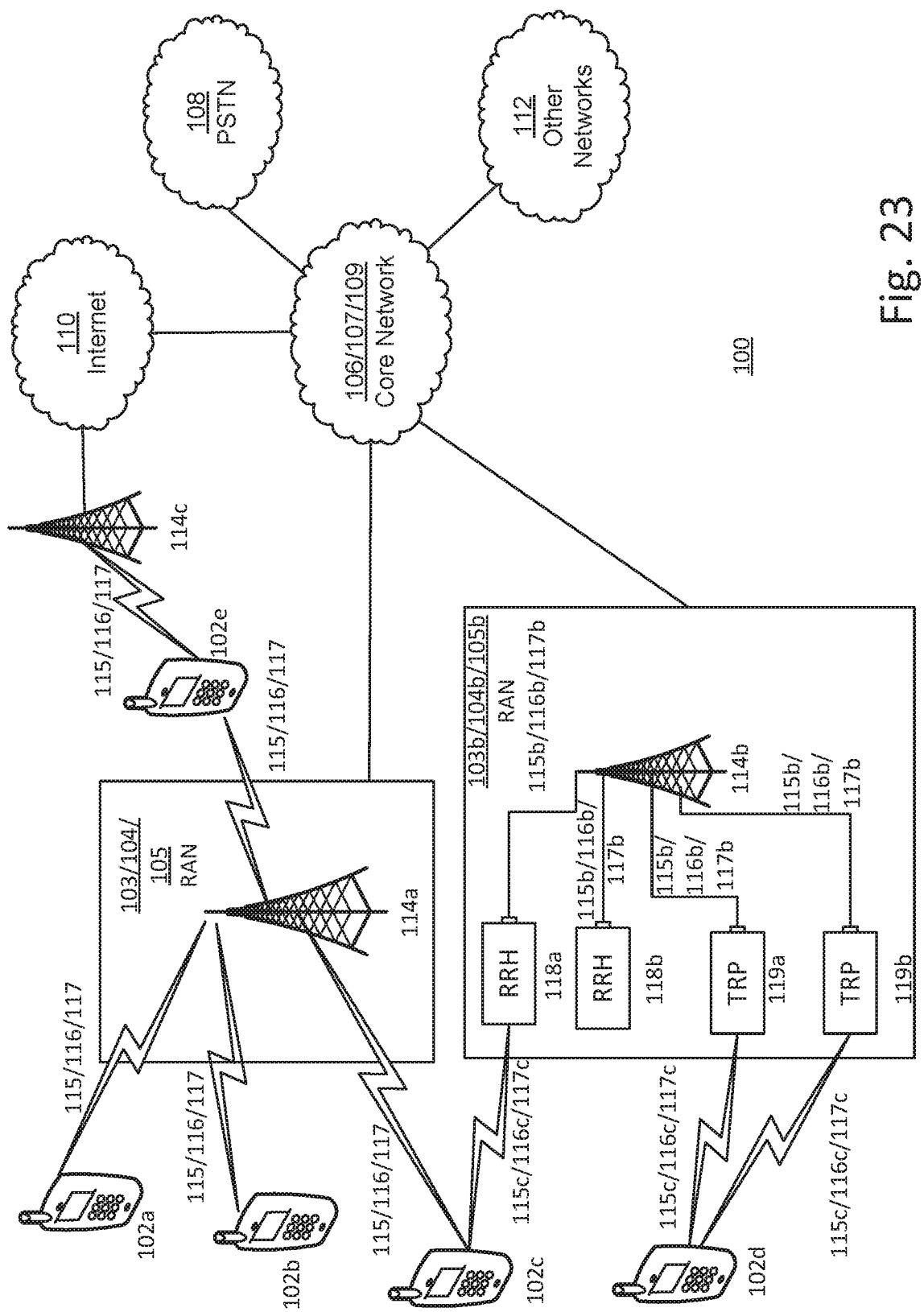
FIG. 23 illustrates one embodiment of an example communications system in which the methods and apparatuses described and claimed herein may be embodiment.

FIG. 23 illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, and/or 102*d* (which generally or collectively may be referred to as WTRU 102), a radio access network (RAN) 103/104/105/103*b*/104*b*/105*b*, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d*, 102*e* may be any type of apparatus or device configured to operate and/or communicate in a wireless environment. Although each WTRU 102*a*, 102*b*, 102*c*, 102*d*, 102*e* is depicted in FIGS. 23-27 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a. 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a. 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a. 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 23 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, May implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 23, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VOIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 23, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 23 may be configured to communicate with the base station 114a, which may employ a cellular-based radio technology, and with the base station 114c, which may employ an IEEE 802 radio technology.

Figure 24:
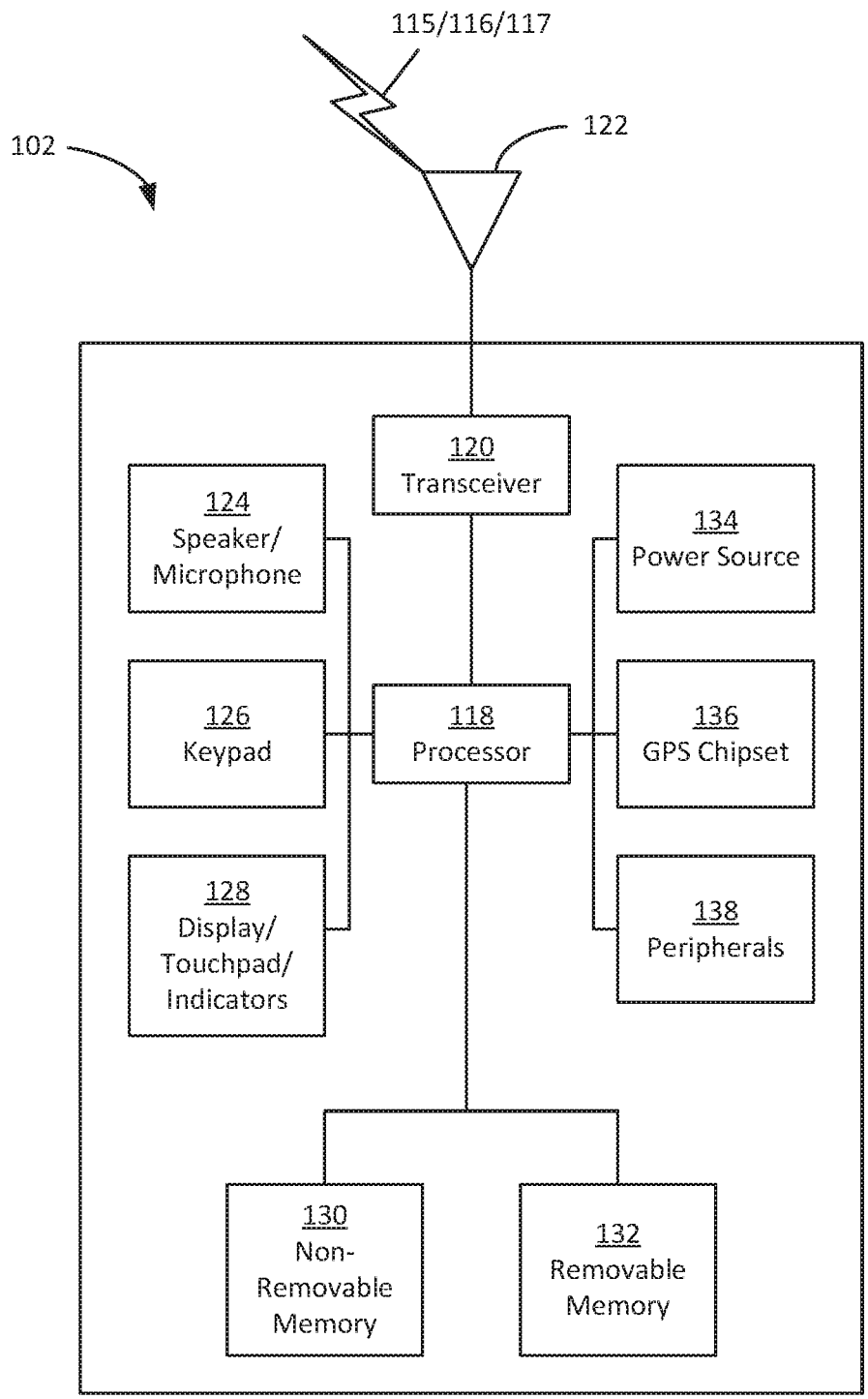
FIG. 24 is a block diagram of an example apparatus or device configured for wireless communications in accordance with the embodiments illustrated herein.

FIG. 24 is a block diagram of an example apparatus or device configured for wireless communications in accordance with the embodiments illustrated herein, such as for example, a WTRU 102. As shown in FIG. 24, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 24 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 24 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/ 117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth®: module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 25:
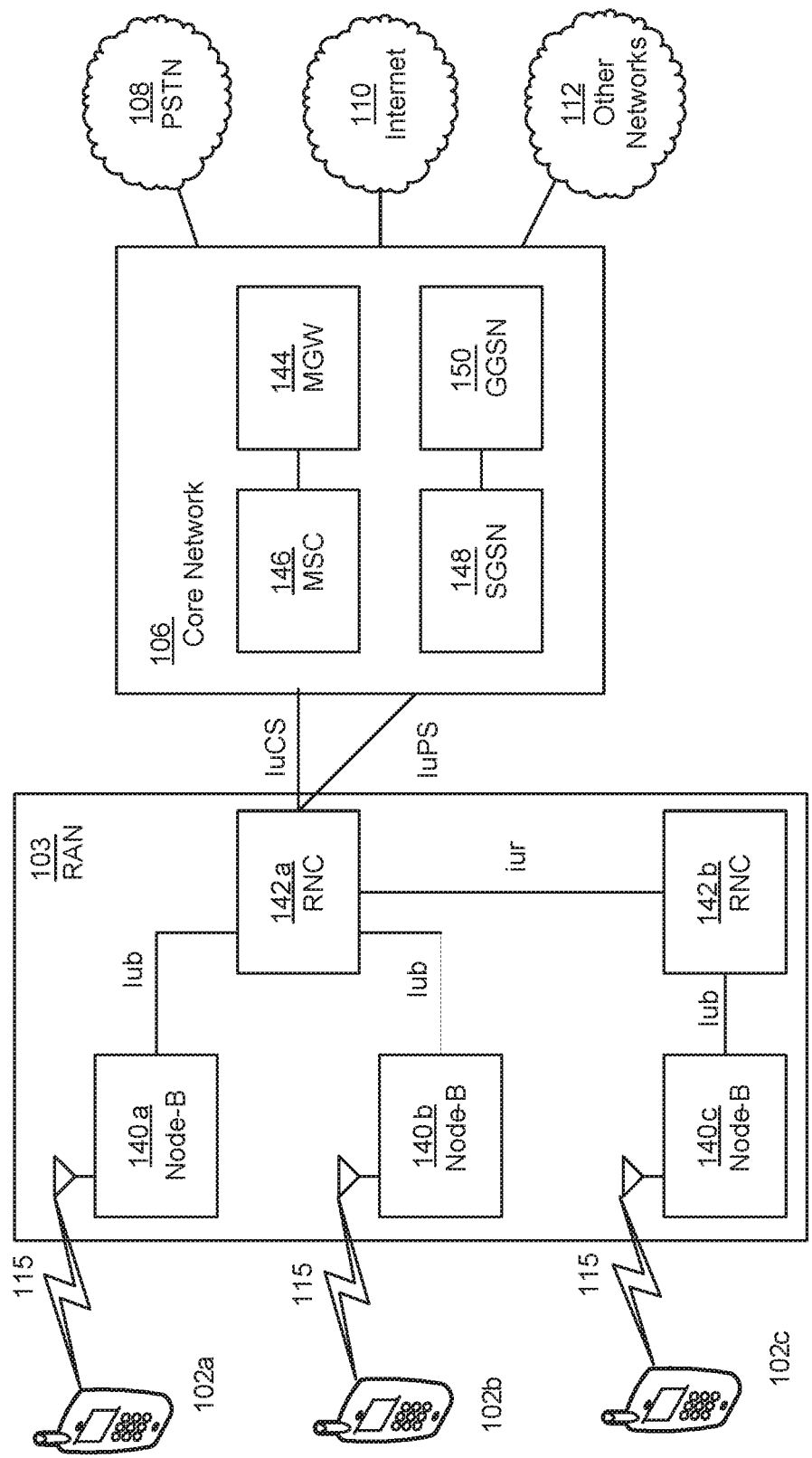
FIG. 25 is a system diagram of the RAN and the core network according to an embodiment.

FIG. 25 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 25, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 25, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 25 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 26:
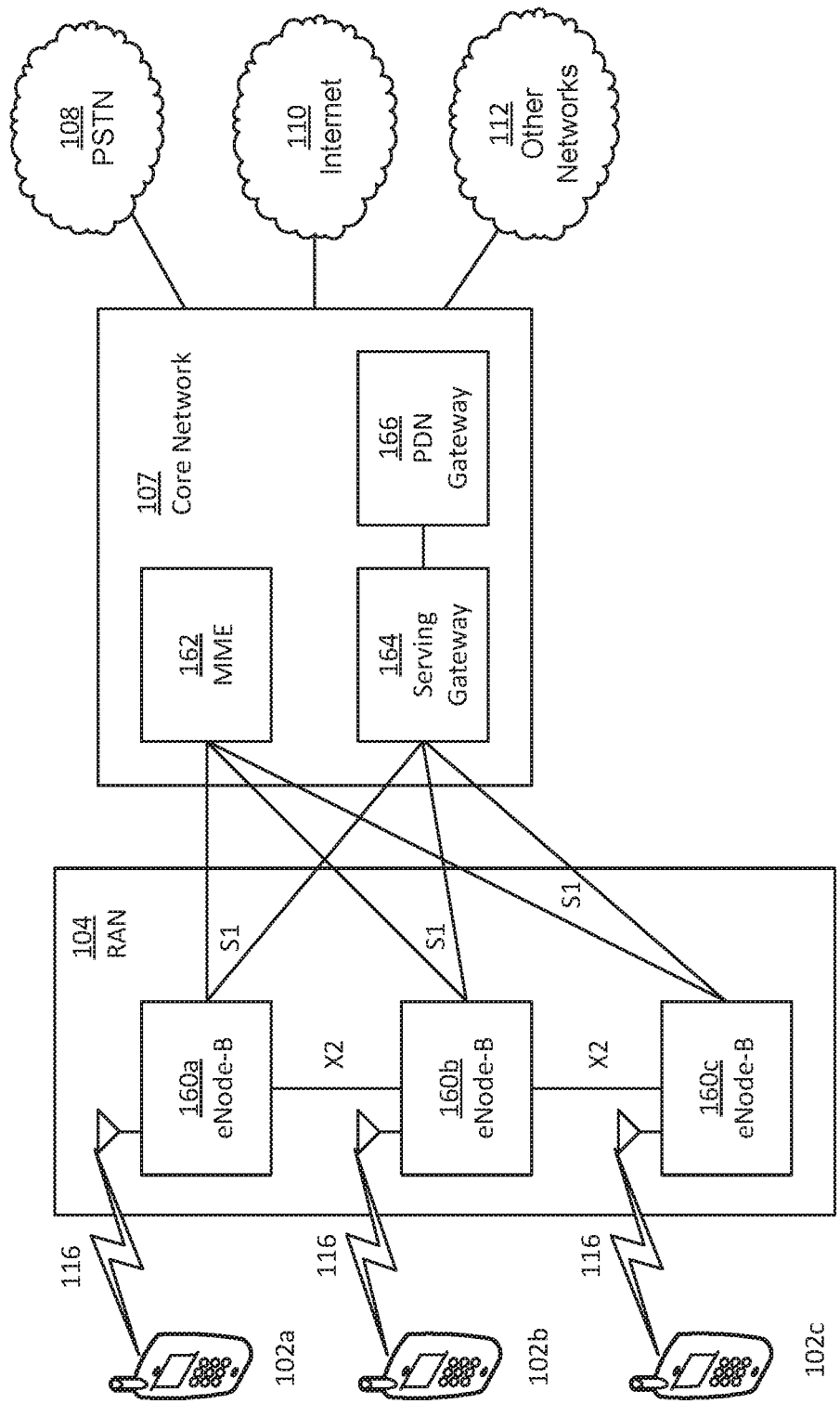
FIG. 26 is a system diagram of the RAN and the core network according to another embodiment.

FIG. 26 is a system diagram of the RAN 104 and the core network 107 according to an embodiment. As noted above, the RAN 104 may employ an E-UTRA radio technology to communicate with the WTRUs 102a. 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 26, the eNode-Bs 160a, 160b, 160c may communicate with one another over an X2 interface.

The core network 107 shown in FIG. 26 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a. 160b, and 160c in the RAN 104 via the SI interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a. 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, and 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 27:
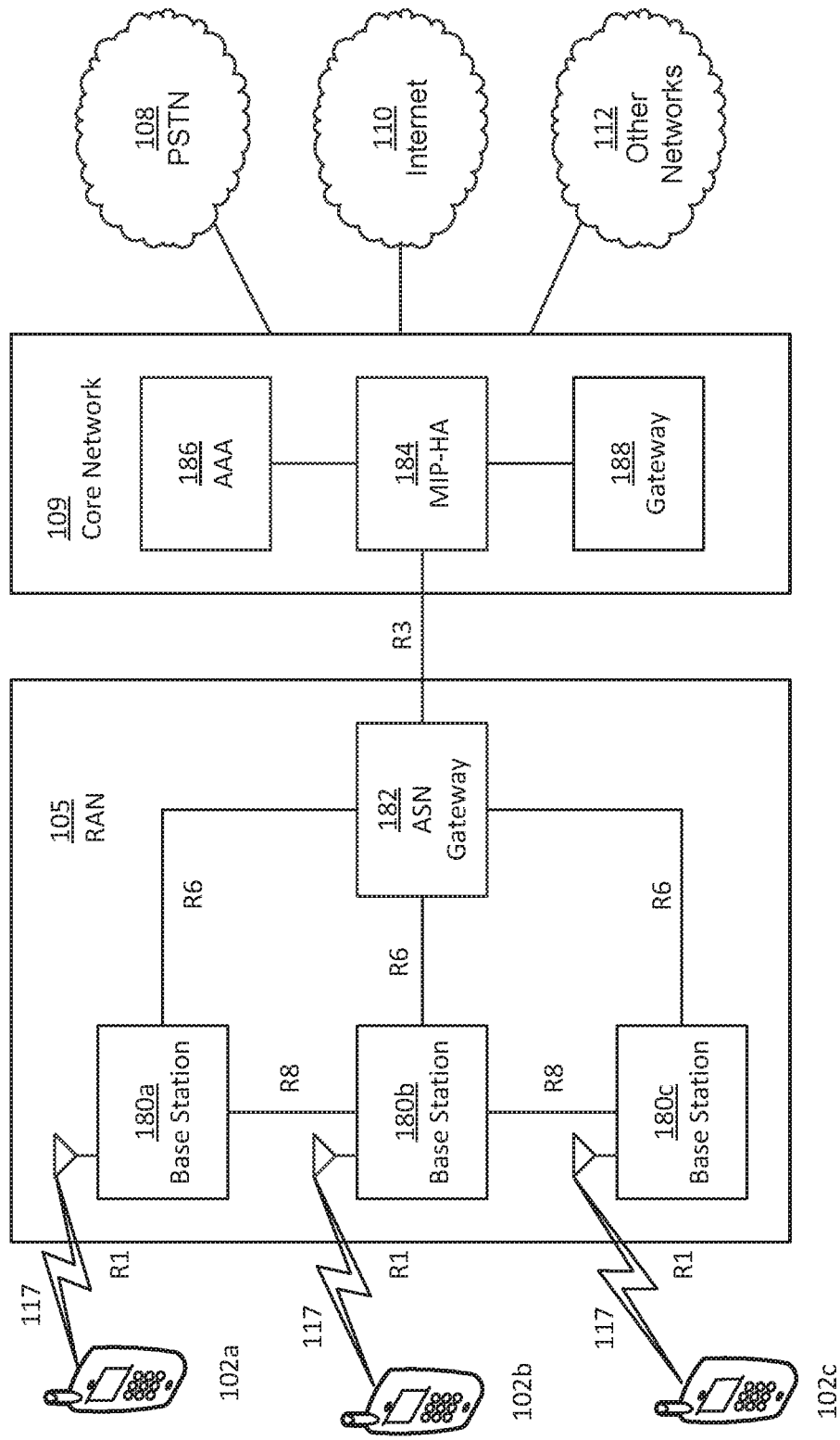
FIG. 27 is a system diagram of the RAN and the core network according to yet another embodiment.

FIG. 27 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 27, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 27, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, and 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, and 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 27, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 23, 25, 26, and 27 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 23, 24, 25, 26, and 27 are provided by way of example only, and it is understood that the subject matter disclosed and claimed herein may be embodied or implemented in any similar communication system, whether presently defined or defined in the future.

Figure 28:
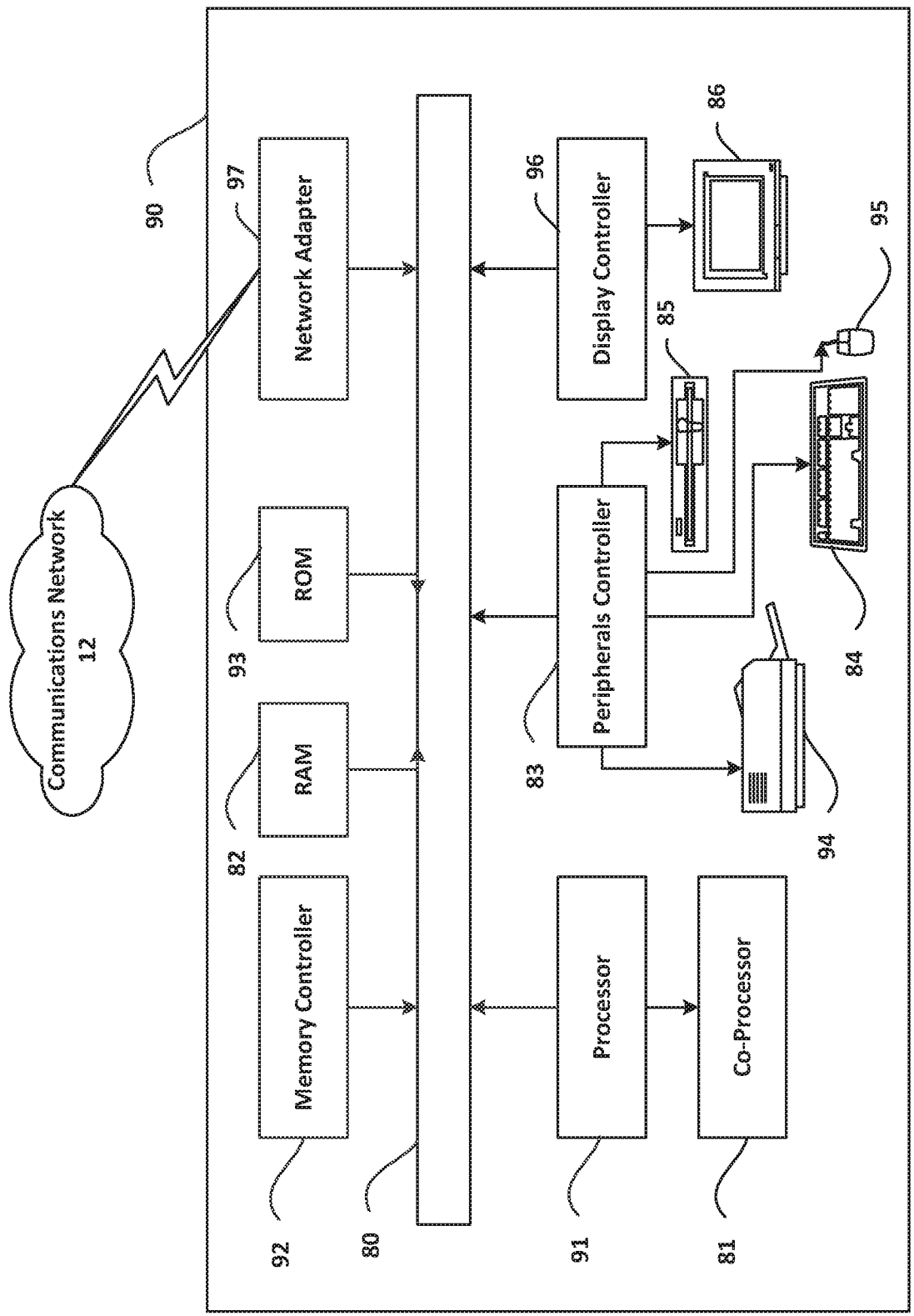
FIG. 28 is a block diagram of an example computing system in which one or more apparatuses of the communications networks illustrated in FIGS. 23, 25, 26, and 27 may be embodied.

FIG. 28 is a block diagram of an exemplary computing system 90 in which one or more apparatuses of the communications networks illustrated in FIGS. 23, 25, 26 and 27 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space: it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90) may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 23, 24, 25, 26, and 27, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

TABLE 1

| Acronyms | |
|---|---|
| CA | Carrier aggregation |
| CCA | Clear channel assessment |
| CORESET | Control resource set |

TABLE 1-continued

Acronyms

| | |
|---|---|
| C-RNTI | Cell radio-network temporary identifier |
| DC | Dual connectivity |
| DCI | DL control information |
| DL | Downlink |
| DL-RS | Downlink reference signal |
| LAA | Licensed-assisted access |
| LBT | Listen before talk |
| LBT_gap_RNTI | Listen before talk gap radio network temporary identified |
| LBT_RNTI | Listen before talk radio network temporary identified |
| LBT_SFI_RNTI | Listen before talk slot frame indicator radio network temporary identified |
| LTE | Long term evolution |
| MAC | Medium access control |
| MAC-CE | Medium access control-control element |
| MCOT | Maximum channel occupancy time |
| NR | New radio |
| NR-U | New radio unlicensed |
| OFDM | Orthogonal frequency division multiplexing |
| Pcell | Primary cell |
| PDCCH | Physical downlink control channel |
| PHY | Physical layer |
| PSS | Primary synchronization signal |
| PUCCH | Physical uplink control channel |
| PUSCH | Physical uplink shared channel |
| QoS | Quality of service |
| RAN | Radio access network |
| RRC | Radio resource control |
| RS | Reference signal |
| SCells | Secondary cells |
| SRS | Sounding reference signal |
| SSB | Synchronization signal block |
| SSS | Secondary synchronization signal |
| TRP | Transmission and reception point |
| UE | User equipment |
| UL | Uplink |

TABLE 2

Spatial relationship of P-, SP-, and dynamic scheduled PUSCH/PUCCH

| Spatial param. | UE mode | Reference RS | PUSCH/PUCCH sched. type | Signaling mode | LBT type |
|---|---|---|---|---|---|
| Spatial | RRC Connected mode | SSB, P-CSI-RS, SP-CSI-RS, AP-CSI-RS, P-SRS SP-SRS, or AP-SRS | Periodic scheduling | RRC | C1, C2, C3, C4, C5, C6, C7, D1, D2, D3 or D4 |
| Spatial | RRC Connected mode | SSB, P-CSI-RS, SP-CSI-RS, AP-CSI-RS, P-SRS SP-SRS, or AP-SRS | Semi-persistent scheduling | RRC and MAC-CE | C1, C2, C3, C4, C5, C6, C7, D1, D2, D3 or D4 |
| Spatial | RRC Connected mode | SSB, P-CSI-RS, SP-CSI-RS, AP-CSI-RS, P-SRS SP-SRS, or AP-SRS | Dynamic scheduling | RRC or RRC and MAC-CE for configuration, indication with DCI | C1, C2, C3, C4, C5, C6, C7, D1, D2, D3 or D4 |
| Spatial | RRC Idle mode/ RRC inactive state | SSB/P-CSI-RS | N/A | No signaling. UE may be configured to monitor the beam with spatial relation to the detected SSB | C1, C2, C3, C4, C5, C6, C7, D1, D2, D3 or D4 |

Note:
RRC—Radio Resource Control;
MAC-CE—Medium Access Control-Control Element

What is claimed is:

1. A wireless transmit/receive unit (WTRU) comprising:
a receiver configured to:
receive, from a base station, a configuration for listen-before-talk (LBT) processing, wherein the LBT processing comprises a determination that a channel is idle before an uplink (UL) transmission is transmitted, wherein the configuration indicates two or more LBT types, wherein a first LBT type of the two or more LBT types is associated with a first time duration for sensing the channel to be idle before an initiation of the UL transmission and a second LBT type of the two or more LBT types is associated with a second time duration for sensing the channel to be idle before the initiation of the UL transmission; and receive a downlink control information comprising a field for LBT type selection;

a processor configured to determine, based on the configuration and the field, the LBT type, of the two or more LBT types, to be performed; and a transmitter configured to transmit the UL transmission, after sensing the channel to be idle for the first time duration if the determined LBT type is the first LBT type or after the second time duration if the determined LBT type is the second LBT type.

2. The WTRU of claim 1, wherein the first time duration or the second time duration comprises one or more slots.

3. The WTRU of claim 1, wherein the receiving the configuration comprises receiving, via downlink (DL) control signaling, the configuration.

4. The WTRU of claim 1, wherein the receiving the configuration comprises receiving the configuration in a radio resource control (RRC) message.

5. The WTRU of claim 1, wherein the base station comprises a gNB.

6. A method for use in a wireless transmit/receive unit (WTRU), the method comprising:
receiving, from a base station, a configuration for listen-before-talk (LBT) processing, wherein the LBT processing comprises a determination that a channel is idle before an uplink (UL) transmission is transmitted, wherein the configuration comprises two or more LBT types, wherein a first LBT type of the two or more LBT types is associated with a first time duration for sensing the channel to be idle before an initiation of the UL transmission and a second LBT type of the two or more LBT types is associated with a second time duration for sensing the channel to be idle before the initiation of the UL transmission;

receiving a downlink control information comprising a field for LBT type selection;

determining, based on the configuration and the field, the LBT type, of the two or more LBT types, to be performed; and transmitting the UL transmission, after sensing the channel to be idle for the first time duration if the determined LBT type is the first LBT type or after the second time duration if the determined LBT type is the second LBT type.

7. The method of claim 6, wherein the first time duration or the second time duration comprises one or more slots.

8. The method of claim 6, wherein the receiving the configuration comprises receiving, via downlink (DL) control signaling, the configuration.

9. The method of claim 6, wherein the receiving the configuration comprises receiving the configuration in a radio resource control (RRC) message.

10. The method of claim 6, wherein the base station comprises a gNB.

11. An apparatus comprising:

one or more processors configured to determine, a configuration for listen-before-talk (LBT) processing, wherein the LBT processing comprises a determination that a channel is idle before an uplink (UL) transmission is transmitted, wherein the configuration indicates two or more LBT types, wherein a first LBT type of the two or more LBT types is associated with a first time duration for sensing the channel to be idle before an initiation of the UL transmission and a second LBT type of the two or more LBT types is associated with a second time duration for sensing the channel to be idle before the initiation of the UL transmission, wherein the configuration indicates a plurality of channel access types for performing an LBT type of the two or more LBT types;

a transmitter configured to transmit, to a wireless transmit/receive unit (WTRU), the configuration and downlink control information comprising a field for LBT type selection; and a receiver configured to receive, from the WTRU, the UL transmission, after the channel was idle for the first time duration if the LBT type to be performed is the first LBT type or after the second time duration if the LBT type to be performed is the second LBT type.

12. The apparatus of claim 11, wherein the first time duration or the second time duration comprises one or more slots.

13. The apparatus of claim 11, wherein the transmitting the configuration comprises transmitting, via downlink (DL) control signaling, the configuration.

14. The apparatus of claim 11, wherein the transmitting the configuration comprises transmitting the configuration in a radio resource control (RRC) message.

15. The apparatus of claim 11, wherein the apparatus comprises a gNB.

* * * * *